(12) United States Patent
Jung et al.

(10) Patent No.: US 11,995,248 B2
(45) Date of Patent: May 28, 2024

(54) USER INTERFACE DEVICE OF DISPLAY DEVICE AND METHOD FOR CONTROLLING THE SAME

(71) Applicant: SAMSUNG ELECTRONICS CO., LTD., Suwon-si (KR)

(72) Inventors: Junho Jung, Suwon-si (KR); Sungjin Son, Suwon-si (KR); Minwoo Lee, Suwon-si (KR); Jooheon Lee, Suwon-si (KR); Hyunseok Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/137,473

(22) Filed: Apr. 21, 2023

(65) Prior Publication Data

US 2024/0019943 A1 Jan. 18, 2024

Related U.S. Application Data

(63) Continuation of application No. PCT/KR2023/003793, filed on Mar. 22, 2023.

(30) Foreign Application Priority Data

Jul. 12, 2022 (KR) ........................ 10-2022-0085783

(51) Int. Cl.
*G06F 3/03* (2006.01)
*G06F 3/0362* (2013.01)
(Continued)

(52) U.S. Cl.
CPC .......... *G06F 3/0312* (2013.01); *G06F 3/0362* (2013.01); *H04N 21/231* (2013.01); *H04N 21/42204* (2013.01); *H04N 21/4667* (2013.01)

(58) Field of Classification Search
USPC ....................................................... 345/157
See application file for complete search history.

(56) References Cited

U.S. PATENT DOCUMENTS 10,200,738 B2 2/2019 Seo et al.
10,292,005 B2 5/2019 Jordan
(Continued)

FOREIGN PATENT DOCUMENTS

JP 6132292 5/2017
KR 10-0792295 1/2008
(Continued)

OTHER PUBLICATIONS

International Search Report dated Jun. 9, 2023 in International Patent Application No. PCT/KR2023/003793.
(Continued)

*Primary Examiner* — Chineyere D Wills-Burns
(74) *Attorney, Agent, or Firm* — STAAS & HALSEY LLP

(57) ABSTRACT

A user interface device and method for controlling a screen by a wheel input signal in a display device. The display device, based on wheel events that continuously occur according to manipulation of a wheel input device by a user reaching a reference number, obtains an average interval of intervals between occurrence times at which the wheel events occur, respectively. The display device displays a result of performing a continuous operation through a display based on the obtained average interval being shorter than a reference interval.

20 Claims, 18 Drawing Sheets

(51) Int. Cl.
*H04N 21/231* (2011.01)
*H04N 21/422* (2011.01)
*H04N 21/466* (2011.01)

(56) References Cited

U.S. PATENT DOCUMENTS

| | | | | |
|---|---|---|---|---|
| 11,347,393 | B2 | 5/2022 | Woo et al. | |
| 2003/0142132 | A1* | 7/2003 | Brown | G06F 3/0481 |
| | | | | 715/768 |
| 2008/0062141 | A1* | 3/2008 | Chandhri | G06F 16/444 |
| | | | | 345/173 |
| 2012/0200598 | A1* | 8/2012 | Yoshimi | G06F 3/0485 |
| | | | | 345/629 |
| 2015/0248204 | A1* | 9/2015 | Morita | H04N 21/4316 |
| | | | | 715/802 |
| 2016/0088060 | A1* | 3/2016 | Rahman | H04L 67/025 |
| | | | | 715/740 |
| 2016/0098190 | A1* | 4/2016 | Lu | G06F 3/04886 |
| | | | | 715/773 |
| 2016/0290824 | A1* | 10/2016 | Tagami | G01C 21/3694 |
| 2018/0098109 | A1* | 4/2018 | Seo | H04N 21/42224 |
| 2018/0181274 | A1* | 6/2018 | Jung | G06F 3/04845 |
| 2018/0199001 | A1* | 7/2018 | Lim | H04N 21/42204 |
| 2019/0012003 | A1* | 1/2019 | Grant | G06F 3/0312 |
| 2021/0392054 | A1 | 12/2021 | David et al. | |
| 2023/0409180 | A1* | 12/2023 | Seo | G06F 3/0482 |

FOREIGN PATENT DOCUMENTS

| | | |
|---|---|---|
| KR | 10-0983158 | 9/2010 |
| KR | 10-1004764 | 1/2011 |
| KR | 10-2016-0067945 | 6/2016 |
| KR | 10-2018-0013515 | 2/2018 |
| KR | 10-2018-0075989 | 7/2018 |
| KR | 10-2018-0082812 | 7/2018 |
| KR | 10-2021-0015489 | 2/2021 |

OTHER PUBLICATIONS

PCT/ISA/237 dated Jun. 9, 2023 in International Patent Application No. PCT/KR2023/003793.

* cited by examiner

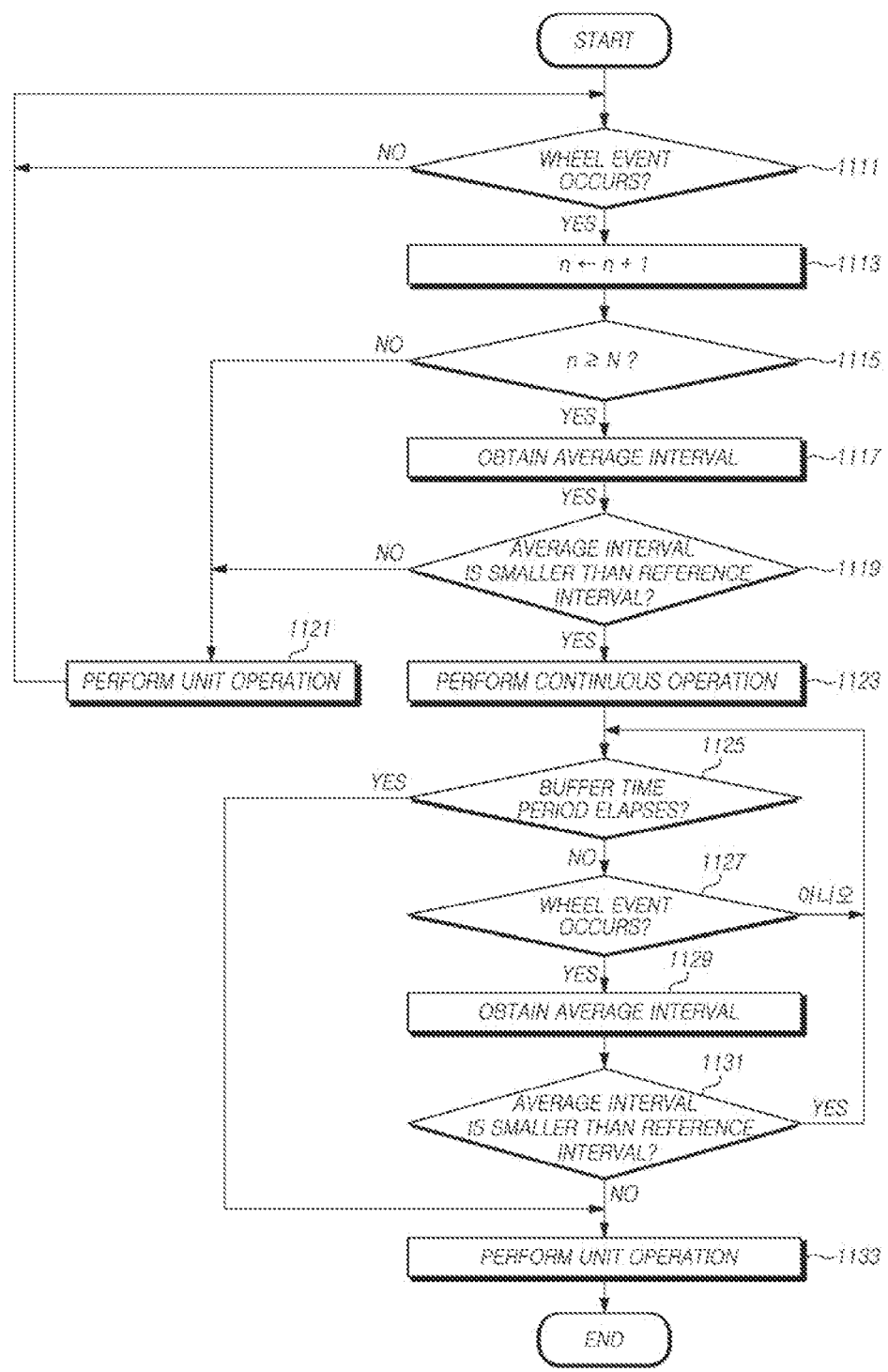

USER INTERFACE DEVICE OF DISPLAY DEVICE AND METHOD FOR CONTROLLING THE SAME

CROSS-REFERENCE TO RELATED APPLICATIONS

This application is a continuation application, under 35 U.S.C § 111(a), of International Application No. PCT/KR2023/003793 designating the United States, filed on Mar. 22, 2023, in the Korean Intellectual Property Receiving Office, which claims priority from Korean Patent Application No. 10-2022-0085783, filed on Jul. 12, 2022, in the Korean Intellectual Property Office, the disclosures of which are hereby incorporated by reference herein in their entireties.

BACKGROUND

Field

The disclosure relates to a user interface device for controlling a screen by a wheel input signal in a display device and a method for controlling the same.

Description of Related Art

In general, a display device, such as a television, may display an image that the user may view. The user may view various contents through a display device. The display device may output, through a display, the broadcast signal transmitted from a broadcasting station or a broadcast or content selected by the user among contents serviced by a content providing server.

The display device may be remotely controlled by the user using a control device, such as a remote control. The control device is being developed in various forms other than a traditional remote control. For example, a mouse, touch panel or keyboard may be used as the control device.

Due to the development of the multimedia industry, the types of services provided by display devices are rapidly increasing. In this case, it is necessary to diversify functions capable of controlling electronic devices, such as display devices by the control device.

SUMMARY

According to an embodiment, a method for a user interface of a display device may comprise, based on wheel events that continuously occur according to manipulation of a wheel input device by a user a reference number, obtaining an average interval of intervals between times at which the wheel events occur, respectively. The user interface method may comprise displaying a result of performing a continuous operation through a display when the obtained average interval is shorter than a reference interval.

According to an embodiment, a display device may comprise an input unit configured to provide an electrical signal according to a wheel event occurring according to manipulation of a wheel input device by a user. The display device may comprise at least one processor configured to recognize the wheel event occurring by the electrical signal provided from the input unit and perform a designated operation in response to the wheel event. The display device may comprise a display configured to display a screen reflecting a result of performing the designated operation by control of the at least one processor. The at least one processor may be configured to, based on wheel events including the wheel event continuously occurring reaching a reference number, obtain an average interval based on intervals between times at which the wheel events including the wheel event occur, respectively. The at least one processor may be configured to display a result of performing a continuous operation through the display when the obtained average interval is shorter than a reference interval.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 is a control flowchart illustrating processing a wheel event in a display device according to an embodiment of the disclosure;

DETAILED DESCRIPTION

Figure 1:
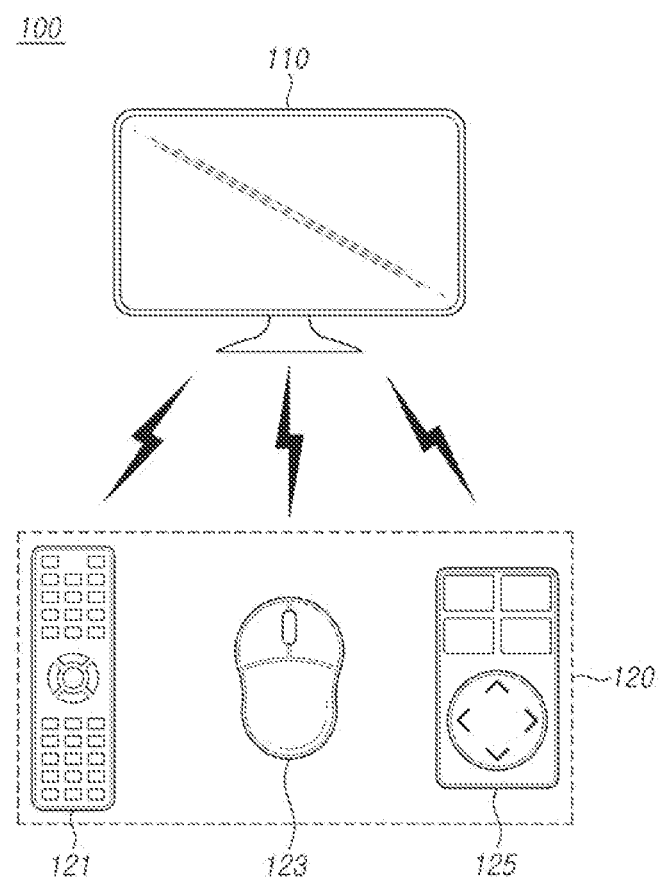
FIG. 1 is a view illustrating a configuration of a display system according to an embodiment of the disclosure.

Embodiments of the disclosure are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

The same or similar reference denotations may be used, as applicable, to refer to the same or similar elements throughout the specification and the drawings.

According to an embodiment of the disclosure, there may be provided a user interface device and method that adaptively performs a unit operation or continuous operation based on wheel event information on a display device controlled by a wheel input device.

The technical objects of the disclosure are not limited to the foregoing, and other technical objects may be derived by one of ordinary skill in the art from example embodiments of the disclosure.

FIG. 1 is a view illustrating a configuration of a display system 100 according to an embodiment of the disclosure.

Referring to FIG. 1, as an example, a display system 100 may include a display device 110 or an input device 120. The display system 100 may be a system in which the user manipulates the input device 120 to control the display device 110. The input device 120 may include, e.g., an input means, such as a wheel, a physical button, or a touch panel. The display device 110 may transmit/receive signals to/from the input device 120 through a wireless interface, such as a wireless channel. The wireless interface may transmit/receive signals according to, e.g., a radio frequency (RF) communication standard or an infrared (IR) communication standard.

The input device 120 may include at least one of a remote control 121, a mouse 123, or a wheel input device 125, but is not limited thereto. For example, although not shown in the drawings, the input device 110 may include a personal portable device, such as a keyboard or a smart phone. An application capable of controlling the display device 110 may be installed on the smart phone, for example. Other various types of devices may be used as the input device 120.

According to one example, the remote control 121 may include a plurality of buttons. Some or all of the plurality of buttons included in the remote control 121 may be physical buttons. The physical buttons may have, e.g., a switch-type structure that generates an electrical signal when pressed by the user. Some or all of the plurality of buttons included in the remote control 121 may be buttons using a touch sensor operated by the user's touch. The remote control 121 may transfer a control signal to the display device 110 in response to the user manipulating a button. For example, the remote control 121 may transfer a control signal corresponding to one button or a combination of at least two buttons to the display device 110 in response to the user's manipulation. The plurality of buttons may include, e.g., direction buttons corresponding to left, back, left, and right. As an embodiment, when one of the direction buttons is pressed by the user, the remote control 121 may transfer a control signal instructing the display device 110 to perform a unit operation. For example, the remote control 121 may transfer a control signal instructing the display device 110 to perform a continuous operation when one of the direction buttons is continuously pressed for a predetermined period of time by the user.

According to an example, the mouse 123 may include at least one button or wheel. Some or all of the at least one button included in the mouse 123 may be physical buttons. The mouse 123 may transfer a control signal to the display device 110 in response to the user manipulating at least one button or wheel. The mouse 124 may include, e.g., a left selection button or a right selection button. In an embodiment, the mouse 123 may transfer a control signal instructing the display device 110 to perform a unit operation or a continuous operation when the user rotates the wheel. The control signal may include information about the direction in which the wheel rotates, the number of wheel events, or information about the interval between wheel events.

According to one example, the wheel input device 125 may include at least one button or wheel. For example, some of at least one button included in the wheel input device 125 may be physical buttons. For example, all the buttons included in the wheel input device 125 may be physical buttons. The wheel input device 125 may transfer a control signal to the display device 110 in response to the user manipulating at least one button or wheel. The wheel input device 125 may include, e.g., at least one of direction buttons corresponding to left, back, left, and right, a power button, or a volume button. As an example, the wheel input device 125 may transfer a control signal instructing the display device 110 to perform a unit operation or a continuous operation when the user rotates the wheel. The control signal may include information about the direction in which the wheel rotates, the number of wheel events, or information about the interval between wheel events.

The display device 110 may be a device having a function of displaying an image that the user may view. The display device 110 allows the user to view various contents. The display device 110 may display, on the display, the broadcast selected by the user among broadcast signals transmitted from broadcasting stations. In addition to the broadcasting function, the display device 110 may provide content, such as movies or music.

According to an example, the display device 110 may receive a control signal from the input device 120 through a wireless channel. The display device 110 may change the channel or volume based on the control signal. The display device 110 may select one of a plurality of items (or objects) displayed on the screen based on the control signal. The display device 110 may control an operation, such as changing the playback section of the video based on the control signal. The control signal may be different according to the type of input device 120. The type of the input device 120 may be classified according to the user's operation method, for example. The input device 120 may include a remote control 121 that uses keys manipulatable by the user's pressing as an input means or a mouse 123 or wheel input device 125 that uses a wheel manipulatable by the user's rotating as an input means.

According to an example, the display device 110 may obtain additional information, such as 'rotation speed' or 'rotation speed variation', as the user manipulates the wheel on the wheel input device 125. The display device 110 may perform a function control function using the obtained additional information. As an example, when considering the rotation speed variation, the display device 110 is required to be able to identify the time interval between occurrences of wheel events on the wheel input device 125. This is why the time intervals between the wheel occurrences on the wheel input device 125 may not be uniform.

For example, the display device 110 may determine the operation mode to perform using the wheel event data provided by the wheel input device 125. The operation mode may be either a unit operation or a continuous operation.

According to an example, the display device 110 may identify whether the wheel rotation of the wheel input device 125 continuously occurs faster than a reference speed using the wheel event data. The display device 110 may determine that the wheel event continuously occurs, e.g., when the number of wheel events occurring in one rotation range (from the start of rotation by the user's manipulation to the end) on the wheel input device 125 meets a reference number. Upon determining that the wheel event continuously occurs, the display device 110 may compare the average (e.g., average interval) of the intervals obtained between the wheel events continuously occurring and a reference interval. If the average interval is shorter than the reference interval, the display device 110 may predict that the wheel rotation is made faster than the reference speed. If the average interval is longer than the reference interval, the display device 110 may predict that the wheel rotation is made slower than the rotation speed.

As an example, when the wheel rotation in the wheel input device 125 does not continuously occur, the display device 110 may perform a unit operation corresponding to one or each of a plurality of wheel events caused by the wheel rotation. As an example, when the wheel rotation in the wheel input device 125 continuously occurs slower than the rotation speed, the display device 110 may perform a unit operation corresponding to one or each of a plurality of wheel events caused by the wheel rotation.

As an example, when the wheel rotation in the wheel input device 125 continuously occurs faster than the reference speed, the display device 110 may perform a continuous operation corresponding to the wheel event caused by the wheel rotation. Although the interval is increased by an wheel event additionally occurring while performing the continuous operation, if the average interval reflecting the increased interval does not exceed the reference interval, the display device 110 may keep on performing the continuous operation. As an example, although the average interval is caused to exceed the reference interval by a newly occurring wheel event, if the newly occurring wheel event does not exceed a buffer time period, the display device 110 may keep on performing the continuous operation.

Figure 2:
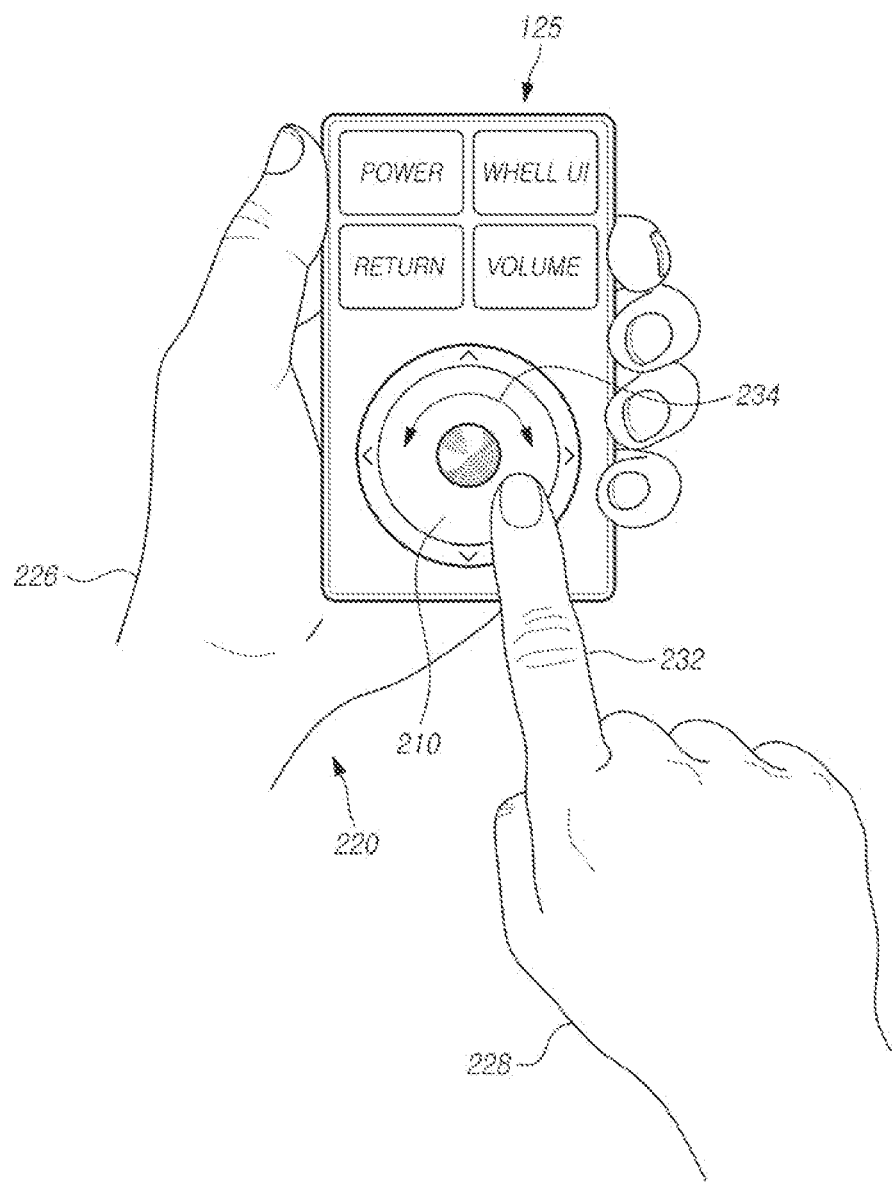
FIG. 2 is a view illustrating an example in which a user uses a wheel input device according to an embodiment of the disclosure.

FIG. 2 is a view illustrating an example in which the user uses a wheel input device (e.g., the wheel input device 125 of FIG. 1) according to an embodiment of the disclosure.

Referring to FIG. 2, as an example, the wheel input device 125 may include a wheel 210, a plurality of function buttons (e.g., a power button POWER, a wheel user interface button WHEEL UI, a return button RETURN, or a volume button VOLUME) or function buttons provided on the wheel 210. The wheel 210 included in the wheel input device 125 may rotate about one axis.

As an example, the user 220 may hold the wheel input device 125 in one hand (e.g., left hand 226) and manipulate the wheel 210 provided in the wheel input device 125 with the other hand (e.g., right hand 228). As an example, the user 220 may rotate the wheel 210 provided in the wheel input device 125 clockwise (forward direction) or counterclockwise (reverse direction) with at least one right finger (e.g., the index finger 232 of the right hand 228) while holding the wheel input device 125 in the left hand 226.

As an example, the wheel input device 125 may continuously be operated by the circular movement of the finger 232 in the arrow (234) direction. The arrow 234 may be marked on, e.g., the wheel 210. For example, the wheel 210 of the wheel input device 125 may be rotated about a virtual axis by the circular movement of the finger 232. In particular, the wheel 210 of the wheel input device 125 may be rotated 360 degrees or more without stop by the manipulation of the user 220 using the finger 232. As an example, the above-described movement of the wheel 210 (e.g., rotation of the wheel 210) may generate, by an incremental operation (e.g., unit operation), a plurality of objects (or items) displayed on the display provided in the display device (e.g., the display device 110 of FIG. 1) or a list including the plurality of objects. The incremental operation (e.g., unit operation) may be, e.g., the operation of sequentially selecting a plurality of objects (or items) according to, e.g., the manipulation of the wheel input device 125. As an example, the above-described movement of the wheel 210 (e.g., rotation of the wheel 210) may generate, by an accelerating operation (e.g., continuous operation), a plurality of objects (or items) displayed on the display provided in the display device (e.g., the display device 110 of FIG. 1) or a list of the plurality of objects. The accelerating operation (e.g., continuous operation) may be, e.g., the operation of selecting a target object (or item) while skipping a predetermined interval for the plurality of objects (or items) according to the manipulation of the wheel input device 125.

According to an embodiment, if the wheel 210 of the wheel input device 125 is rotated a desired angle or more at the reference speed or more, one or more wheel events may occur. Here, the wheel event may correspond to an event that generates a tick signal, e.g., whenever the wheel 210 is rotated by a predetermined angle. The tick signal may be a pulse signal generated as the wheel 210 is rotated a predetermined angle. The wheel input device 125 may configure wheel event data by information regarding one or more wheel events. The wheel input device 125 may provide the wheel event data to the display device 110. The display device 110 may obtain information regarding one or more wheel events from the wheel event data. The display device 110 may identify that the wheel 210 has been rotated by a desired angle or more at the reference speed or more based on the information regarding one or more wheel events. Upon identifying that the wheel 210 has been rotated the desired angle or more at the reference speed or more, the display device 110 may perform an accelerating operation (e.g., continuous operation).

According to an embodiment, if the wheel 210 of the wheel input device 125 is not rotated more than the desired angle or is rotated the desired angle or more at less than the reference speed, the wheel event data generated thereby may be provided to the display device 110. In this case, the display device 110 may identify that the wheel 210 is not rotated more than the desired angle or is rotated the desired angle or more at less than the reference speed based on the wheel event data. Upon identifying that the wheel 210 is not rotated more than the desired angle or is rotated the desired angle at less than the reference speed, the display device 110 may perform an incremental operation (e.g., unit operation).

As an example, if the wheel 210 of the wheel input device 125 is not rotated more than the desired angle, the wheel event data generated thereby may be provided to the display device 110. In this case, the display device 110 may identify that the wheel 210 is not rotated more than the desired angle based on the wheel event data. Upon identifying that the wheel 210 is not rotated more than the desired angle, the display device 110 may perform an incremental operation (e.g., unit operation).

As an example, if the wheel 210 of the wheel input device 125 is rotated the desired angle or more at less than the reference speed, the wheel event data generated thereby may be provided to the display device 110. In this case, the display device 110 may identify that the wheel 210 is rotated the desired angle or more at less than the reference speed based on the wheel event data. Upon identifying that the wheel 210 has been rotated the desired angle or more at less than the reference speed, the display device 110 may perform an incremental operation (e.g., unit operation).

As described above, the display device 110 may perform differentiated control considering the speed at which the user 220 rotates the wheel 210 provided in the wheel input device 125. As an example, when the wheel 210 is rotated quickly at a predetermined angle, the display device 110 may perform a continuous operation and display the result through the display. For example, when the wheel 210 is rotated the predetermined angle at a non-rapid speed, the display device 110 may perform a unit operation. The predetermined angle may be a rotational angle at which the wheel input device 125 may generate a predetermined number of wheel events (e.g., tick generation). The rapid speed may correspond to a case where the entire required time from the start of rotation of the wheel 210 to the end of the rotation or the average interval of inter-wheel event intervals is shorter than a preset reference interval. The interval may be a time interval from when a wheel event occurs to when the next wheel event occurs.

Figure 3:
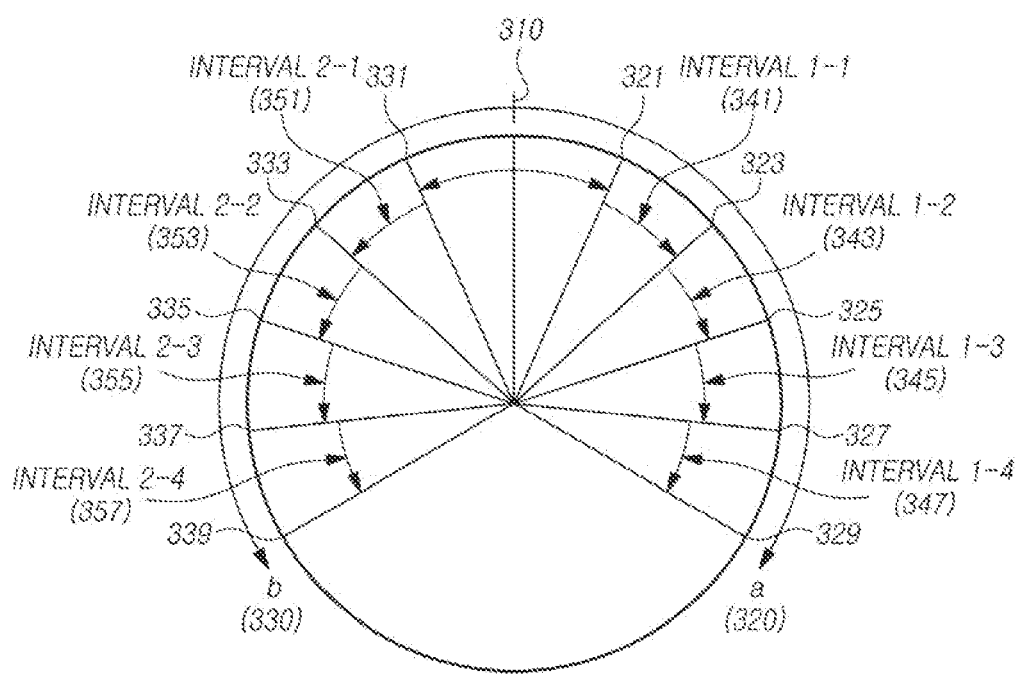
FIG. 3 is a view illustrating an example in which a wheel is manipulated by a user in a wheel input device according to an embodiment of the disclosure.

FIG. 3 is a view illustrating an example in which a wheel (e.g., the wheel 210 of FIG. 2) is manipulated by a user (e.g., the user 220 of FIG. 2) in a wheel input device (e.g., the wheel input device 125 of FIG. 1) according to an embodiment of the disclosure.

Referring to FIG. 3, as an example, the wheel 210 may have a structure in which it may be rotated either clockwise (a) 320 or counterclockwise (b) 330 by the manipulation of the user 220.

According to an example, the wheel input device 125 may determine that a wheel event occurs whenever the wheel 210 is rotated at a predetermined angle either clockwise (a) 320 or counterclockwise (b) 330. The predetermined angle may be preset considering the sensitivity of the wheel operation. The sensitivity of the wheel operation may be increased as the angle to detect the occurrence of the wheel event is decreased. The sensitivity of the wheel operation may be decreased as the angle to detect the occurrence of the wheel event is increased.

For example, the rotation of the wheel 210 of the wheel input device 125 may be performed in a forward rotation range 360. The forward rotation range 360 may be a period during which the wheel 210 is rotated clockwise (a) 320 by one continuous manipulation (e.g., rotation manipulation) by the user 220. The forward rotation range 360 may be determined by the start position and end position of the clockwise (a) 320 rotation of the wheel 210. For example, if the forward rotation of the wheel 210 starts in a first position 310 and stops in a second position 329, the forward rotation range 360 may be from the first position 310 to the second position 329. In the forward rotation range 360, tick signals corresponding to five forward wheel events 321, 323, 325, 327, and 329 may be generated. For example, the forward wheel events 321, 323, 325, 327, and 329 may occur when the wheel 210 is rotated at the predetermined angle in the forward direction, i.e., clockwise (a) 320. The five forward wheel events 321, 323, 325, 327, and 329 include a first forward wheel event 321 corresponding to the generation of a first forward tick signal, a second forward wheel event 323 corresponding to the generation of a second forward tick signal, a third forward wheel event 325 corresponding to the generation of a third forward tick signal, a fourth forward wheel event 327 corresponding to the generation of a fourth forward tick signal, or a fifth forward wheel event 329 corresponding to the generation of a fifth forward tick signal.

For example, the five forward wheel events 321, 323, 325, 327, and 329 may have independent occurrence times. A predetermined time interval may exist between the occurrence times of the forward wheel events 321, 323, 325, 327, and 329. Hereinafter, the time interval existing between the forward wheel events 321, 323, 325, 327, and 329 is referred to as a "forward interval". The forward intervals caused by the forward wheel events 321, 323, 325, 327, and 329 may include a first forward interval (INTERVAL 1-1) 341, a second forward interval (INTERVAL 1-2) 343, a third forward interval (INTERVAL 1-3) 345, and a fourth forward interval (INTERVAL 1-4) 347. The first forward interval (INTERVAL 1-1) 341 may correspond to the time difference from the occurrence (or detection) of the first forward wheel event 321 to the occurrence (or detection) of the second forward wheel event 323. The second forward interval (INTERVAL 1-2) 343 may correspond to the time difference from the occurrence (or detection) of the second forward wheel event 323 to the occurrence (or detection) of the third forward wheel event 325. The third forward interval (INTERVAL 1-3) 345 may correspond to the time difference from the occurrence (or detection) of the third forward wheel event 325 to the occurrence (or detection) of the fourth forward wheel event 327. The fourth forward interval (INTERVAL 1-4) 347 may correspond to the time difference from the occurrence (or detection) of the fourth forward wheel event 327 to the occurrence (or detection) of the fifth forward wheel event 329.

The first to fourth forward intervals (INTERVAL 1-1) 341 to (INTERVAL 1-4) 347 may be the same or different from each other. If the user 220 manipulates the wheel 210 to rapidly rotate in the forward direction (a) 320, the forward interval may be decreased. If the user 220 manipulates the wheel 210 to rotate slowly in the forward direction (a) 320, the forward interval may be increased. If the user 220 manipulates the wheel 210 to rotate at varying speeds rather than a constant speed, the forward interval between wheel events may vary. For the variation in the forward rotation speed, the occurrence times of the wheel events may not be uniform according to the rotation speed variation considering only the occurrence times of the wheel events. As an example, when the occurrence times of the wheel events are not uniform, the display device (e.g., the display device 110 of FIG. 1) may determine whether the wheel 210 is rotated by continuous motion, considering the average interval of the forward intervals between the occurrence times of a predetermined number of forward wheel events.

For example, the rotation of the wheel 210 of the wheel input device 125 may be performed in a reverse rotation range 370. The reverse rotation range 370 may be a period during which the wheel 210 is rotated counterclockwise (b) 330 by one continuous manipulation (e.g., rotation manipulation) by the user 220. The reverse rotation range 370 may be determined by the start position and end position of the counterclockwise (b) 330 rotation of the wheel 210. For example, if the reverse rotation of the wheel 210 starts in a first position 310 and stops in a third position 339, the reverse rotation range 370 may be from the first position 310 to the third position 339. In the forward rotation range 360, tick signals corresponding to five reverse wheel events 331, 333, 335, 337, and 339 may be generated. For example, the reverse wheel events 331, 333, 335, 337, and 339 may occur when the wheel 210 is rotated at the predetermined angle in the reverse direction, i.e., counterclockwise (b) 330. The five reverse wheel events 331, 333, 335, 337, and 339 include a first reverse wheel event 331 corresponding to the generation of a first reverse tick signal, a second reverse wheel event 333 corresponding to the generation of a second reverse tick signal, a third reverse wheel event 335 corresponding to the generation of a third reverse tick signal, a fourth reverse wheel event 337 corresponding to the generation of a fourth reverse tick signal, or a fifth reverse wheel event 339 corresponding to the generation of a fifth reverse tick signal.

For example, the five reverse wheel events 331, 333, 335, 337, and 339 may have independent occurrence times. A predetermined time interval may exist between the occurrence times of the reverse wheel events 331, 333, 335, 337, and 339. Hereinafter, the time interval existing between the reverse wheel events 331, 333, 335, 337, and 339 is referred to as a "reverse interval".

The reverse intervals caused by the forward wheel events 331, 333, 335, 337, and 339 may include a first reverse interval (INTERVAL 2-1) 351, a second reverse interval (INTERVAL 2-2) 353, a third reverse interval (INTERVAL 2-3) 355, and a fourth reverse interval (INTERVAL 2-4) 357. The first reverse interval (INTERVAL 2-1) 351 may correspond to the time difference from the occurrence (or detection) of the first reverse wheel event 331 to the occurrence (or detection) of the second reverse wheel event 333. The second reverse interval (INTERVAL 2-2) 353 may correspond to the time difference from the occurrence (or detection) of the second reverse wheel event 333 to the occurrence (or detection) of the third reverse wheel event 335. The third reverse interval (INTERVAL 2-3) 355 may correspond to the time difference from the occurrence (or detection) of the third reverse wheel event 335 to the occurrence (or detection) of the fourth reverse wheel event 337. The fourth reverse interval (INTERVAL 2-4) 357 may correspond to the time difference from the occurrence (or detection) of the fourth reverse wheel event 337 to the occurrence (or detection) of the fifth reverse wheel event 339.

The first to fourth reverse intervals (INTERVAL 2-1) 351 to (INTERVAL 2-4) 357 may be the same or different from each other. If the user 220 manipulates the wheel 210 to rapidly rotate in the reverse direction (b) 330, the reverse interval may be decreased. If the user 220 manipulates the wheel 210 to rotate slowly in the reverse direction (b) 330, the reverse interval may be increased. If the user 220 manipulates the wheel 210 to rotate at varying speeds rather than a constant speed, the reverse interval may vary. For the variation in the reverse rotation speed, the occurrence times of the wheel events may not be uniform according to the rotation speed variation considering only the occurrence times of the wheel events. As an example, when the occurrence times of the wheel events are not uniform, the display device 110 may determine whether the wheel 210 is rotated by continuous motion, considering the average interval of the reverse intervals between the occurrence times of a predetermined number of reverse wheel events.

According to an example, the wheel input device 125 may provide the display device 110 with wheel event data according to the occurrence of a wheel event that the wheel 210 is rotated either clockwise (a) 320 or counterclockwise (b) 330. The wheel event data may include wheel event information according to rotation at a predetermined angle or rotation direction information indicating the rotation direction of the wheel 210 (e.g., clockwise (forward direction) or counterclockwise (reverse direction)). The wheel event information may be a pulsed tick signal. For example, the wheel event information may be a signal that a pulse is triggered at the time when the tick corresponding to the wheel event occurs.

According to an example, the display device 110 may determine whether the rotation of the wheel 210 of the wheel input device 125 is continuously made by the manipulation of the user 220 based on the wheel event information. For example, when the wheel event information includes information according to the continuous occurrence of wheel events meeting a reference number (e.g., N=3), the display device 110 may determine that the rotation of the wheel 210 is continuously made. The reference number may be a reference for determining that the wheel 210 has been manipulated by the continuous motion of the user 220. For example, if the wheel event information indicates the occurrence of tick signals exceeding the reference number, the rotation of the wheel 210 may be regarded as being made by the continuous motion of the user 220.

According to an example, upon recognizing the occurrence of forward wheel events 321, 323, 325, 327, and 329 meeting the reference number in the forward rotation range by the wheel input device 125, the display device 110 may obtain the average interval based on the forward intervals (e.g., the first to fourth forward intervals (INTERVAL 1-1 (341) to INTERVAL 1-4(347)) present between the occurrence times of the forward wheel events 321, 323, 325, 327, and 329. The average interval may be, e.g., the quotient obtained by dividing the sum of the first to fourth forward intervals (INTERVAL 1-1(341) to INTERVAL 1-4(347)) by the number of the forward intervals (e.g., the number of wheel event occurrences−1 (N−1=4)). If the average interval is shorter than the reference interval, the display device 110 may perform a continuous operation. The continuous operation may output a screen in which, e.g., when a plurality of items are arranged on the screen in the horizontal direction, the currently selected item is slid to the right corresponding to the forward direction (e.g., clockwise (a) 320) where the wheel event occurs, so that a specific item is selected by the continuous movement. If the average interval is not shorter than the reference interval, the display device 110 may perform a unit operation. The unit operation may output a screen in which, e.g., when a plurality of items are arranged on the screen in the horizontal direction, an item disposed in the next position to the currently selected item, in the right direction corresponding to the forward direction (e.g., clockwise (a) 320) where the wheel event occurs is selected.

According to an example, upon recognizing the occurrence of reverse wheel events 331, 333, 335, 337, and 339 meeting the reference number in the reverse rotation range by the wheel input device 125, the display device 110 may obtain the average interval based on the reverse intervals (e.g., the first to fourth forward intervals (INTERVAL 2-1 (351) to INTERVAL 2-4(357)) present between the occurrence times of the reverse wheel events 331, 333, 335, 337, and 339. The average interval may be the quotient obtained by dividing the sum of the first to fourth reverse intervals (INTERVAL 2-1(351) to INTERVAL 2-4 (357)) by the number of the forward intervals (e.g., the number of wheel event occurrences−1 (N−1=4)). If the average interval is shorter than the reference interval, the display device 110 may perform a continuous operation. The continuous operation may output a screen in which, e.g., when a plurality of items are arranged on the screen in the horizontal direction, the currently selected item is slid to the left corresponding to the reverse direction (e.g., counterclockwise (b) 330) where the wheel event occurs, so that a specific item is selected by the continuous movement. If the average interval is not shorter than the reference interval, the display device 110 may perform a unit operation. The unit operation may output a screen in which, e.g., when a plurality of items are arranged on the screen in the horizontal direction, an item disposed in the next position to the currently selected item, in the left direction corresponding to the reverse direction (e.g., counterclockwise (b) 330) where the wheel event occurs is selected.

As described above, the display device 110 may perform whether to perform a unit operation or continuous operation considering the rotation speed of the wheel 210 and whether the wheel event continuously occurs in the wheel input device 125. For example, the display device 110 may determine whether the wheel event continuously occurs based on whether a reference number of wheel events continuously occur. As an example, the display device 110 may determine whether the rotation speed corresponds to the continuous motion based on whether the average (e.g., average interval) of the time intervals between the wheel events is less than, or not more than, the reference interval.

Figure 4:
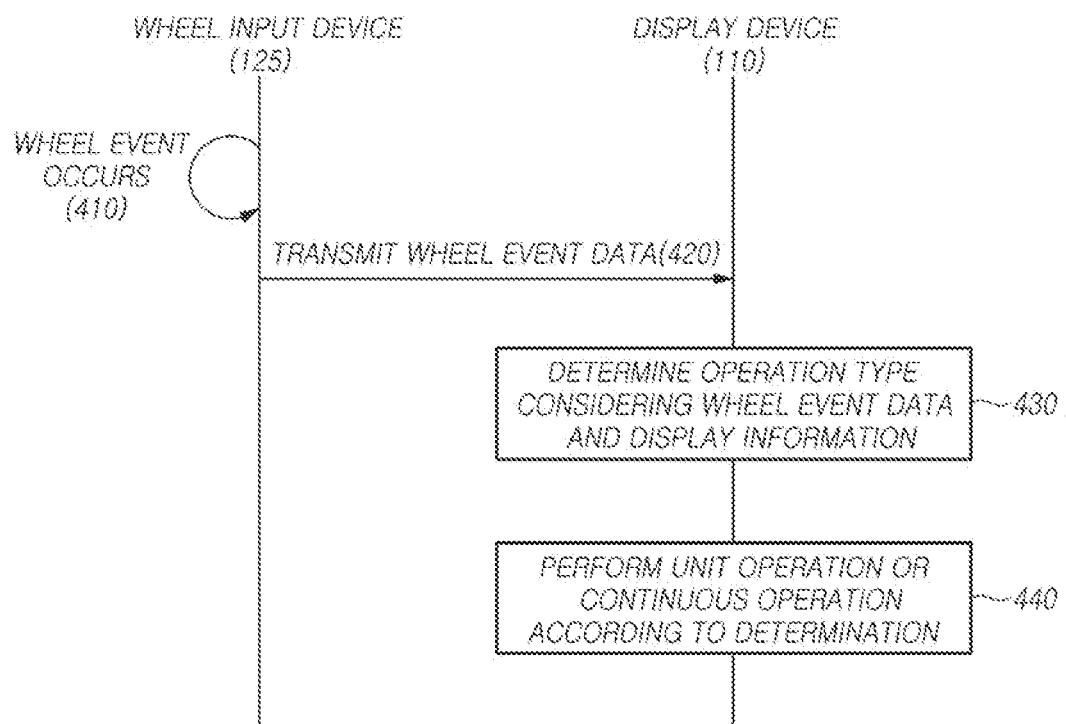
FIG. 4 is a signal flowchart of a display system according to an embodiment of the disclosure.

FIG. 4 is a signal flowchart of a display system (e.g., the display system 100 of FIG. 1) according to an embodiment of the disclosure.

Referring to FIG. 4, the wheel input device (e.g., the wheel input device 125 of FIG. 1) may obtain the occurrence of a wheel event (e.g., the forward wheel event 321, 323, 325, 327, or 329 of FIG. 3) or the reverse wheel event 331, 333, 335, 337, or 339 of FIG. 3) by manipulation of the wheel (e.g., the wheel 210 of FIG. 2) by the user (e.g., the user 220 of FIG. 2) (operation 410). The user 220 may rotate the wheel 210 clockwise (e.g., clockwise (a) 320 of FIG. 3) or counterclockwise (e.g., counterclockwise (b) 330 of FIG. 3). In this case, the wheel input device 125 may obtain the occurrence of the wheel event. The wheel event may be an event that generates a tick signal, e.g., whenever the wheel 210 is rotated by a predetermined angle. The number of wheel event occurrences may be proportional to the number of tick signal generations in the wheel input device 125. The tick signal may be a pulse signal generated as the wheel 210 is rotated a predetermined angle.

If at least one wheel event occurs, the wheel input device 125 may transmit wheel event data to the display device 110 (operation 420). The wheel input device 125 may configure wheel event data, corresponding to, e.g., at least one wheel event. As an example, the wheel event data may include direction indication information or wheel event information.

The direction indication information may indicate the rotation direction of the wheel event (e.g., clockwise (a) 320 or counterclockwise (b) 330 of FIG. 3). The wheel event information may be tick information according to the rotation angle of the wheel 210. The tick information may be information regarding the generation of a pulsed tick signal. For example, the wheel event information may be a signal that a pulse is triggered at the time when the tick signal corresponding to the wheel event occurs.

The display device 110 may determine an operation type considering wheel event data and display information (operation 430). Here, the operation type may include, e.g., a unit operation or a continuous operation. The display device 110 may receive wheel event data transmitted by the wheel input device 125. The display device 110 may obtain direction indication information or wheel event information from the wheel event data. The display device 110 may determine whether wheel events meeting the reference number (e.g., N=3) continuously occur in the wheel input device 125 by the manipulation of the user 220 based on the wheel event information. The reference number may be a reference for determining whether the wheel 210 has been continuously manipulated by the continuous motion of the user 220.

For example, if the wheel event information includes information indicating the wheel event occurrences (tick signal generations) exceeding the reference number, the display device 110 may recognize that the wheel 210 has been continuously rotated by the continuous motion of the user 220. Upon recognizing that the wheel 210 has been continuously rotated in one direction (e.g., clockwise (a) 320 or counterclockwise (b) 330), the display device 110 may obtain the average interval according to the continuous rotation. The average interval may be obtained by averaging the intervals (e.g., the first to fourth forward intervals INTERVAL 1-1(341) to INTERVAL 1-4(347) or first to fourth reverse intervals INTERVAL 2-1(351) to INTERVAL 2-4(357) of FIG. 3) present between the occurrence times of the wheel events (e.g., the forward wheel events 321, 323, 325, 327, and 329 or reverse wheel events 331, 333, 335, 337, and 339 of FIG. 3). The average interval may be, e.g., the quotient obtained by dividing the sum of the first to fourth forward intervals (INTERVAL 1-1(341) to INTERVAL 1-4(347)) by the number of the intervals (e.g., the number of wheel event occurrences−1 (N−1=4)). If the average interval is shorter than the reference interval, the display device 110 may select a continuous operation. If the average interval is not shorter than the reference interval, the display device 110 may select a unit operation.

The display device 110 may perform a unit operation or continuous operation according to determination (operation 440). The continuous operation may be, e.g., an operation of outputting a screen in which when a plurality of items are arranged on the screen in the horizontal direction, the currently selected item is slid in the wheel event occurring direction (e.g., clockwise (a) 320 or counterclockwise (b) 330) so that a specific item is selected. The unit operation may be, e.g., an operation of outputting a screen in which when a plurality of items are arranged on the screen in the horizontal direction, an item disposed in the next position to the currently selected item in the wheel event occurring direction (e.g., clockwise (forward direction) or counterclockwise (reverse direction) (b) 330) is selected.

Figure 5:
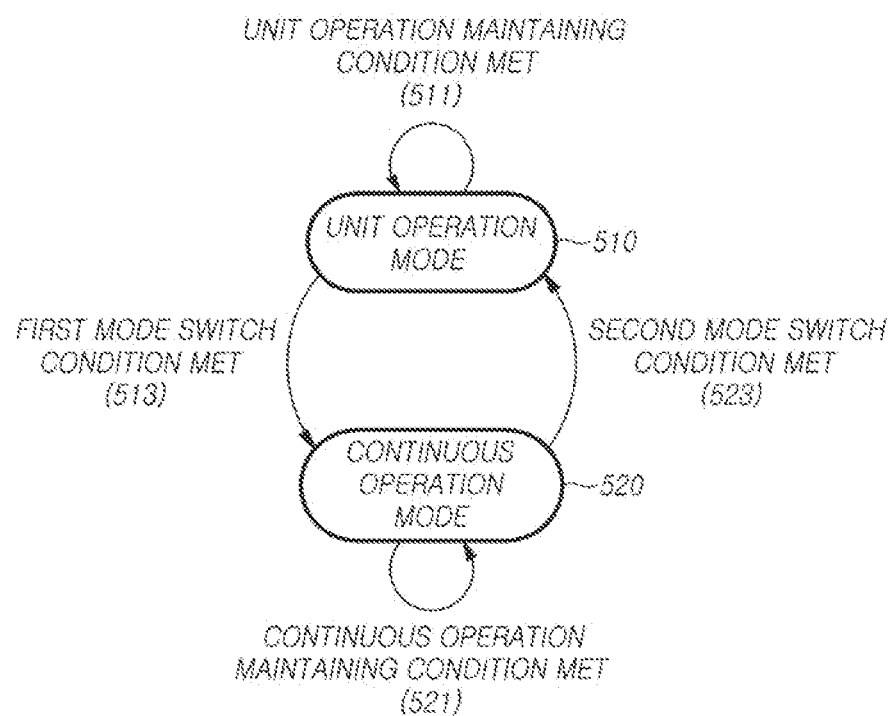
FIG. 5 is a view illustrating a state switch between operation modes in a display device according to an embodiment of the disclosure.

FIG. 5 is a view illustrating a state switch between operation modes in a display device (e.g., the display device 110 of FIG. 1) according to an embodiment of the disclosure.

Referring to FIG. 5, as an example, the operation mode that may be performed in the display device 110 may include a unit operation mode 510 or a continuous operation mode 520. The unit operation mode 510 may be, e.g., an operation mode in which when a plurality of items are arranged on the screen in the horizontal direction (e.g., refer to FIG. 13A), an item disposed in the next position to the currently selected item in the wheel event occurring direction (e.g., clockwise (forward direction) (a) 320 or counterclockwise (reverse direction) (b) 330) is selected whenever the wheel event occurs. The continuous operation mode 520 may be, e.g., an operation mode in which when a plurality of items are arranged on the screen in the horizontal direction (e.g., refer to FIG. 13A), the currently selected item is slid (e.g., refer to FIG. 13C) in the wheel event occurring direction (e.g., clockwise (forward direction) (a) 320 or counterclockwise (reverse direction) (b) 330) so that a specific item is selected (e.g., refer to FIG. 13D) considering the rotation speed of the wheel 210.

For example, the display device 110 may determine the operation mode to perform using the wheel event data provided by the wheel input device 125. The operation mode may be either a unit operation 510 or a continuous operation 520.

According to an example, the display device 110 may identify whether the wheel (210) rotation of the wheel input device 125 continuously occurs faster than a reference speed using the wheel event data. The display device 110 may determine that the wheel event continuously occurs, e.g., when the number of wheel events occurring in one rotation range (e.g., the forward rotation range or reverse rotation range of FIG. 3) on the wheel input device 125 meets a reference number (e.g., N=3). Upon determining that the wheel event continuously occurs, the display device 110 may compare the average (e.g., average interval) of the intervals obtained between the wheel events continuously occurring and a reference interval. If the average interval is shorter than the reference interval, the display device 110 may predict that the wheel (210) rotation is made faster than the reference speed. If the average interval is longer than the reference interval, the display device 110 may predict that the wheel (210) rotation is made slower than the rotation speed.

For example, the display device 110 in the unit operation mode 510 may maintain the operation in the unit operation mode 510 when meeting a unit operation maintaining condition (operation 511). The unit operation maintaining condition may be, e.g., that the wheel (210) rotation in the wheel input device 125 does not continuously occur or continuously occurs slower than the rotation speed. As an example, the display device 110 may determine that the wheel event does not continuously occur when the number of wheel events does not reach the reference number (e.g., N=3). As an example, the display device 110 may obtain the average interval as the number of wheel events reaches the reference number (e.g., N=3). When the average interval is longer than the reference interval, the display device 110 may determine that the wheel 210 has been rotated slower than the rotation speed.

As an example, the display device 110 in the unit operation mode 510 may switch the state from the unit operation mode 510 to the continuous operation mode 520 when meeting a first mode switch condition (operation 513). The first mode switch condition may be an interval condition and the number of wheel events provided for the display device 110 to switch from the unit operation mode 510 to the continuous operation mode 520. As an example, the first mode switch condition may be that the wheel (210) rotation in the wheel input device 125 continuously occurs faster than the rotation speed. As an example, the display device 110 may obtain the average interval as the number of wheel events reaches the reference number (e.g., N=3). When the average interval is shorter than the reference interval, the display device 110 may determine that the wheel 210 has been continuously rotated faster than the rotation speed.

For example, the display device 110 in the continuous operation mode 520 may maintain the operation in the continuous operation mode 520 when meeting a continuous operation maintaining condition (operation 521). The continuous operation maintaining condition may be, e.g., that the wheel (210) rotation in the wheel input device 125 continuously occurs faster than the rotation speed. As an example, the display device 110 may obtain the average interval as the number of wheel events reaches the reference number (e.g., N=3). When the average interval is shorter than the reference interval, the display device 110 may determine that the wheel 210 has been continuously rotated faster than the rotation speed. As an example, the display device 110 may obtain the average interval as the number of wheel events reaches the reference number (e.g., N=3). Although the average interval is longer than the reference interval, if the last obtained interval does not exceed the buffer time period, the display device 110 may determine that the wheel 210 has been continuously rotated faster than the rotation speed.

As an example, the display device 110 in the continuous operation mode 520 may switch the state from the continuous operation mode 520 to the unit operation mode 510 when meeting a first mode switch condition (operation 523). The second mode switch condition may be an interval condition and the number of wheel events provided for the display device 110 to switch from the continuous operation mode 520 to the unit operation mode 510. As an example, the second mode switch condition may be that the wheel (210) rotation in the wheel input device 125 occurs slower than the rotation speed. As an example, the display device 110 may obtain the average interval as the number of wheel events reaches the reference number (e.g., N=3). When the average interval is longer than the reference interval, the display device 110 may determine that the wheel 210 has been rotated slower than the rotation speed. As an example, if the number of wheel events reaches the reference number (e.g., N=3), but the last obtained interval exceeds the buffer time period, the display device 110 may determine that the wheel 210 has rotated slower than the rotation speed. As an example, if the number of wheel events reaches the reference number (e.g., N=3), but no new wheel event occurs until the buffer time period elapses after the last wheel event occurs, the display device 110 may determine that the wheel 210 has rotated slower than the rotation speed.

Figure 6:
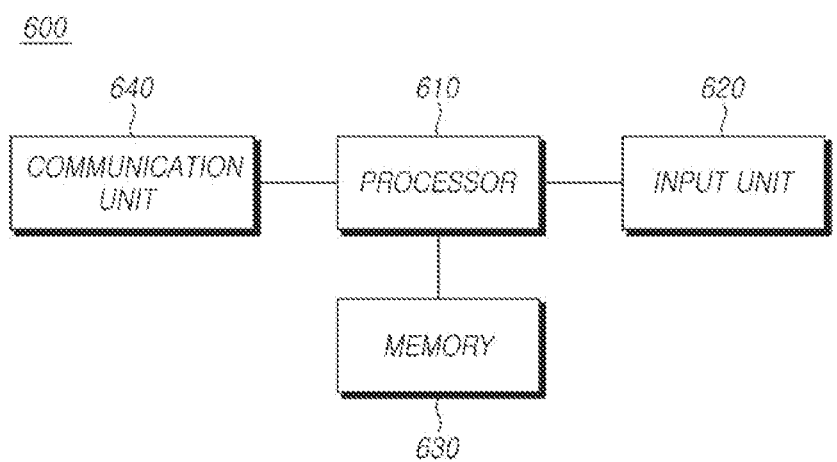
FIG. 6 is a block diagram illustrating a wheel input device according to an embodiment of the disclosure.

FIG. 6 is a block diagram illustrating a wheel input device (e.g., the wheel input device 125 of FIG. 1) according to an embodiment of the disclosure.

Referring to FIG. 6, as an example, a wheel input device 600 may include at least one processor 610, an input unit 620, a memory 630, or a communication unit 640. Although not shown, the wheel input device 600 may further include a display. To provide other additional functions, the wheel input device 600 may additionally include at least one component not shown.

The communication unit 640 may transmit/receive signals to/from the display device (e.g., the display device 110 of FIG. 1). The signal transmitted to the display device 110 by the communication unit 640 may be, e.g., a signal generated as the user (e.g., the user 220 of FIG. 2) manipulates a button in a remote control (e.g., the remote control 121 of FIG. 1) or manipulates a wheel (e.g., the wheel 210 of FIG. 2) in a wheel input device (e.g., the wheel input device 125 of FIG. 1). For example, the communication unit 640 may be a wireless communication unit that transmits/receives signals through a wireless interface, such as a wireless channel. In this case, the communication unit 640 may include a radio frequency (RF) module capable of transmitting/receiving wireless signals to/from the display device 110 according to an RF communication standard. For example, the communication unit 640 may include an infrared (IR) module capable of transmitting/receiving signals to/from the display device 110 according to an IR communication standard. In this case, as necessary, the communication unit 640 may transmit commands for performing functions, such as power on/off, channel switch, volume change, or item selection, to the display device 110 through the IR module.

The input unit 620 may include at least one component for receiving information according to the user's (e.g., user 220 of FIG. 2) manipulation, such as a keypad, button, wheel key, touch pad, or touchscreen. The input unit 620 may input a command related to the display device 110 by manipulation of the user 220. When the input unit 620 may include a hard key that is a physical button, the user 220 may input a command related to the display device 700 to the input device 120 by pressing the hard key. When the input unit 620 includes a wheel (e.g., the wheel 210 of FIG. 2), the input unit 620 may generate a tick signal corresponding to one or more wheel events (e.g., the forward wheel event 321, 323, 325, 327, or 329 or reverse wheel event 331, 333, 335, 337, or 339) as the wheel 210 is rotated in the first direction (e.g., clockwise (a) 320 of FIG. 3) or reverse direction (e.g., counterclockwise (b) 330 of FIG. 3) by the manipulation of the user 220. The wheel 210 manipulated by the user 220 may be implemented as an image displayed on the touch pad rather than a physical component. In this case, a wheel event may be generated in response to a rotation motion (drag) after a touch by the user 220.

For example, when an input of the wheel 210 by manipulation of the user 220 is detected, the input unit 620 may sense values, such as a rotation direction, number of rotations, or rotation angle, corresponding to the wheel input. In response to receiving an activation signal from the display device 110, the input unit 620 may sense a value corresponding to wheel event information, such as a rotation direction, number of rotations, or rotation angle, corresponding to rotation of the wheel 210.

The memory 630 may store various types of programs or application data necessary for controlling or operating the wheel input device 600. For example, the memory 630 may temporarily or permanently store values corresponding to wheel event information, such as a rotation direction, number of rotations, or rotation angle, according to the wheel event generated by the user 220 manipulating the wheel 210. The memory 630 may manage the wheel event information, such as rotation direction, number of rotations, or rotation angle, in a database, to be utilized during subsequent operation of the wheel input device 600.

The processor 610 may control all the matters related to the control of the wheel input device 600. The processor 610 may transmit a signal corresponding to the manipulation of a predetermined key of the input unit 620 or the manipulation of the wheel 210 or a signal corresponding to the movement of the wheel input device 600 to the display device 110 through the communication unit 640. For example, upon receiving an activation signal from the display device 110, the processor 610 may transmit a control signal corresponding to the key input or wheel input detected from the input unit 620 to the display device 110.

The configuration of the wheel input device 600 of FIG. 6 is merely an example, and the wheel input device 600 may have some components integrated or may add or omit some components depending on its actual implementation. In other words, if necessary, two or more components may be combined into one component, or one component may be subdivided into two or more components. Further, the function performed by each component is for describing an example, and the specific operation or function may be modified as needed, but embodiments of the disclosure are not limited thereto.

Figure 7:
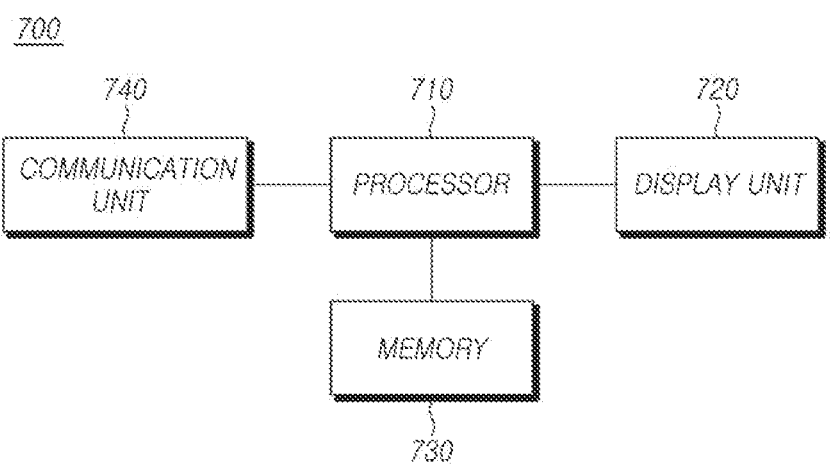
FIG. 7 is a block diagram illustrating a display device according to an embodiment of the disclosure.

FIG. 7 is a block diagram illustrating a display device (e.g., the display device 110 of FIG. 1) according to an embodiment of the disclosure.

Referring to FIG. 7, as an example, a display device 700 may include at least one processor 710, a communication unit 720, a display unit 730, or a memory 740.

According to an example, the communication unit 720 may include one or more components for communicating with an external device (e.g., the input device 120 of FIG. 1). For example, the communication unit 720 may transmit an activation signal to the input device 120 through short-range communication. The communication unit 720 may receive a control signal corresponding to a wheel key input from the input device 120. In this case, the short-range communication may include a Wi-Fi scheme, NFC scheme, Bluetooth scheme, infrared scheme, or Zigbee scheme, but is not limited thereto.

According to an example, the processor 710 controls overall operation of the display device 700 or signal flow between internal components of the display device 700 and performs the data processing function. The processor 710 may execute an operating system (OS) and various applications stored in the memory 740 when there is the user's input or when a preset and stored condition is met.

The processor 710 according to an example may include one or more processors and a memory. For example, one or more processors may execute one or more programs stored in the memory. The processor 710 may be a single-core, dual-core, triple-core, or quad-core processor or a processor including more multiple cores.

According to an example, the processor 710 may determine whether the display device 700 is in a state controllable by the wheel input device 125. If the display device 700 is in a state controllable by the wheel input device 125, the processor 710 may control the communication unit 720 to transmit a control signal for activating the wheel input device 125 to the wheel input device 125. The processor 710 may receive a control signal, such as wheel event information, from the wheel input device 125. The processor 710 may determine various interactions suitable for the current context based on a control signal, such as wheel event information, received from the wheel input device 125 or context information about the screen displayed on the display unit 730. For example, the processor 710 may control the display device 700 to perform one of a unit operation or a continuous operation according to the determined interaction.

According to an example, the processor 710 may obtain, through the communication unit 720, additional information, such as 'rotation speed' or 'rotation speed variation', as the user manipulates the wheel on the wheel input device 125. The processor 710 may perform function control using the additional information about 'rotation speed' or 'rotation speed variation'. When the rotation speed variation is considered, the time interval between the occurrence times of the wheel events in the wheel input device 125 is not uniform, requiring that the processor 710 separately determine them.

For example, the processor 710 may determine the operation mode to perform using the wheel event data provided by the wheel input device 125. The operation mode may be either a unit operation or a continuous operation.

According to an example, the processor 710 may identify whether the wheel rotation of the wheel input device 125 continuously occurs faster than a reference speed using the wheel event data. The processor 710 may determine that the wheel event continuously occurs, e.g., when the number of wheel events occurring in one rotation range (from the start of rotation by the user's manipulation to the end) on the wheel input device 125 meets a reference number. Upon determining that the wheel event continuously occurs, the processor 710 may compare the average (e.g., average interval) of the intervals obtained between the wheel events continuously occurring and a reference interval. If the average interval is shorter than the reference interval, the processor 710 may predict that the wheel rotation is made faster than the reference speed. If the average interval is longer than the reference interval, the processor 710 may predict that the wheel rotation is made slower than the rotation speed.

As an example, when the wheel rotation in the wheel input device 125 does not continuously occur or continuously occurs slower than the reference speed, the processor 710 may perform a unit operation corresponding to each occurring wheel event. As an example, when the wheel rotation in the wheel input device 125 continuously occurs faster than the reference speed, the processor 710 may perform a continuous operation corresponding to the continuously occurring wheel event. Although the interval is increased by an wheel event additionally occurring while performing the continuous operation, if the average interval reflecting the increased interval does not exceed the reference interval, the processor 710 may keep on performing the continuous operation. As an example, although the average interval is caused to exceed the reference interval by a newly occurring wheel event, if the newly occurring wheel event does not exceed a buffer time period, the processor 710 may keep on performing the continuous operation.

According to an example, the display unit 730 converts an image signal, a data signal, an OSD signal, or a control signal processed by the processor 710 to generate a driving signal. The display unit 730 may be implemented as a PDP, LCD, OLED, or flexible display. The display unit 730 may be implemented as a three-dimensional (3D) display. The display unit 730 may be configured as a touchscreen and used as an input device as well as an output device. For example, the display unit 730 may display a screen changed according to the interaction determined by the processor 710, but is not limited thereto.

The memory 740 may store various data, programs, or applications for driving and controlling the display device 700 under the control of the processor 710. The memory 740 may include a broadcast reception module, a channel control module, a volume control module, a communication control module, a voice recognition module, a motion recognition module, a light reception module, a display control module, an audio control module, an external input control module, a power control module, a power control module of an external device connected wirelessly (e.g., Bluetooth), a voice database (DB), or a motion database (DB) which is not shown. The not shown modules and database of the memory 740 may be implemented as software to perform a broadcast reception control function, a channel control function, a volume control function, a communication control function, a voice recognition function, a motion recognition function, a light reception control function, a display control function, an audio control function, an external input control function, a power control function, or a power control function of an external device connected wirelessly (e.g., Bluetooth) in the display device 700.

The configuration of the display device 700 of FIG. 7 is merely an example, and the display device 700 may have some components integrated or may add or omit some components depending on its actual implementation. In other words, if necessary, two or more components may be combined into one component, or one component may be subdivided into two or more components. Further, the function performed by each component is for describing an example, and the specific operation or function may be modified as needed, but embodiments of the disclosure are not limited thereto.

According to an example, the display device 700 may further include a tuner unit, a video processing unit, a detection unit, or a microphone.

The tuner unit may tune and select only the frequency of the channel to be received by the display device 700 among many radio components, by amplifying, mixing, and resonating the broadcast signals wirelessly received. The broadcast signal may include audio, video, or additional information (e.g., electronic program guide (EPG)). The tuner unit may receive the broadcast signal in the frequency band corresponding to the channel number according to a user input (e.g., the control signal received from the control device, e.g., channel number input, channel up/down input and channel input on the EPG screen). The tuner unit may receive broadcast signals from various sources, such as terrestrial broadcasts, cable broadcasts, satellite broadcasts, Internet broadcasts, and the like. The tuner unit may receive broadcast signals from a source, such as analog broadcasting or digital broadcasting.

The video processing unit may perform processing on the video data received by the display device 700. The video processing unit may perform various types of image processing, such as decoding, scaling, noise filtering, frame rate conversion, or resolution conversion, on the video data.

The detection unit may receive the light signal (including a control signal) received from the external control device (e.g., the input device 120 of FIG. 1) through a receiving portion, such as a light window (not shown) in the bezel of the display unit 730. The detection unit may receive a light signal corresponding to the user input (e.g., touch, press, touch gesture, voice, or motion) from the input device 120. The detection unit detects the user's voice, the user's video, or the user's interaction. The detection unit according to an example may include a microphone for receiving the user's uttered voice. The microphone may convert the received voice into an electrical signal and output it to the processor 710. The detection unit 260 may also detect the user input and transfer the detected signal to the processor 710. The detection unit may detect user inputs, such as channel-up/down, power on/off, channel selection, and screen setting, from the input device 120. As an example, the detection unit may detect input of a control signal according to wheel manipulation provided in the wheel input device 125.

Figure 8:
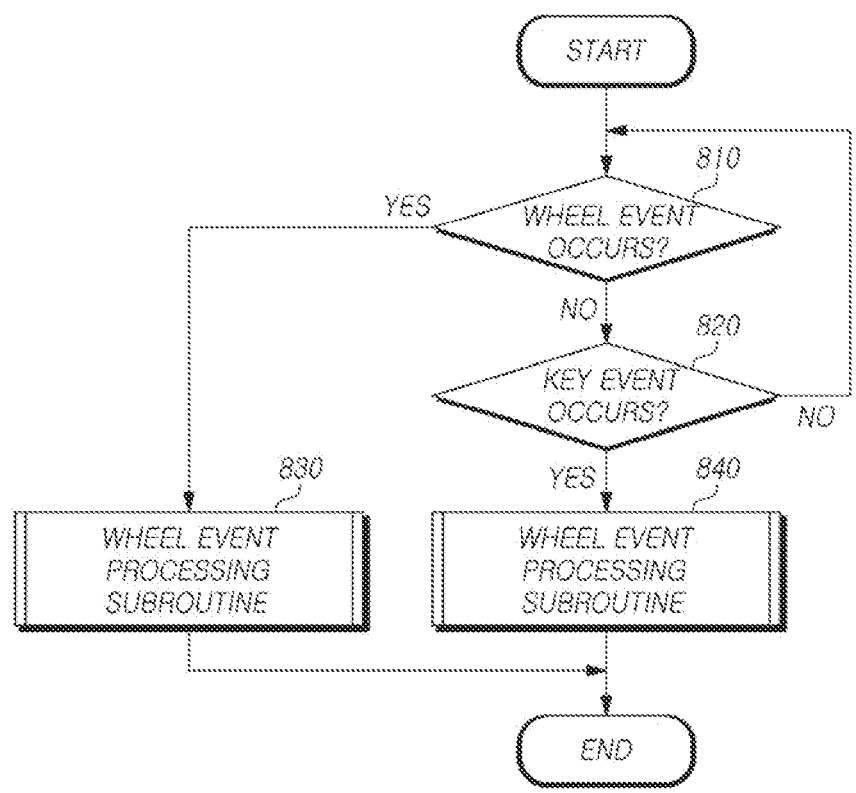
FIG. 8 is a control flowchart illustrating a main routine for processing a wheel event in a display device according to an embodiment of the disclosure.

FIG. 8 is a control flowchart illustrating a main routine for processing a wheel event in a display device (e.g., the display device 110 of FIG. 1) according to an embodiment of the disclosure.

Referring to FIG. 8, in operation 810, the display device 110 may determine whether a wheel event occurs in the wheel input device (e.g., the wheel input device 125 of FIG. 1). The wheel event may occur as the user (e.g., the user 220 of FIG. 1) rotates (e.g., as indicated by the arrow 234 of FIG. 2) the wheel (e.g., the wheel 210 of FIG. 2) of the wheel input device 125 in either the forward direction (e.g., clockwise (a) 320 of FIG. 3) or reverse direction (e.g., counterclockwise (b) 330 of FIG. 3). For example, the wheel event may correspond to the occurrence of a tick signal whenever the wheel 210 is rotated a predetermined angle by the user. The predetermined angle may be set considering the sensitivity of the wheel operation. The sensitivity of the wheel operation may be increased as the angle to detect the occurrence of the wheel event is decreased. The sensitivity of the wheel operation may be decreased as the angle to detect the occurrence of the wheel event is increased. One or several continuous wheel events may occur in the rotation range (e.g., the forward rotation range 360 or reverse rotation range 370 of FIG. 3) corresponding to the distance or angle of the wheel 210 as the user 220 manipulates it once. In the following description, it is assumed that several wheel events occur in the rotation ranges 360 and 370. If only one wheel event occurred in the rotation ranges 360 and 370, the display device 110 would perform the unit operation once. In other words, with one wheel event, the display device 110 would not perform a continuous operation.

According to an example, the display device 110 may receive wheel event data from the wheel input device 125 and detect the occurrence of a wheel event based on the wheel event data. The wheel event data may be configured by the wheel input device 125 due to the occurrence of at least one wheel event by the manipulation of the wheel 210 by the user 220. The wheel event data may include information regarding the wheel event. The information regarding the wheel event may include, e.g., identification information indicating the rotation direction, the number of wheel events, and/or inter-wheel event interval information. The identification information indicating the rotation direction may be information indicating the rotation direction (e.g., clockwise (a) 320 of FIG. 3 or the reverse direction (e.g., counterclockwise (b) 330 of FIG. 3)) of the wheel 210 by the manipulation of the user 220. The number of wheel events may be, e.g., information indicating the number of tick signals generated in one rotation ranges 360 and 370. The inter-wheel event interval information may be, e.g., the time interval between wheel events occurring in one rotation range 360 or 370, i.e., the interval (e.g., the forward intervals 341, 343, 345, and 347 or reverse intervals 351, 353, 355, and 357 of FIG. 3). The intervals may be the same, similar, or different for each wheel event. The interval may be considered to predict the rotation speed of the wheel 210 by the manipulation of the user 220. For example, if five wheel events occur in one rotation range 360 or 370, the display device 110 may determine that the wheel event occurs corresponding to each of the five wheel events.

According to an example, upon detecting that the wheel event occurs, the display device 110 may perform a wheel event processing subroutine for processing the wheel event in operation 830. The display device 110 may determine an operation to be performed in response to the wheel event. For example, the display device 110 may determine one of a continuous operation or a unit operation as an operation to be performed in response to the wheel event. The unit operation may be referred to as a discrete operation. As an example, if wheel events meeting the reference number continuously occur in the wheel input device 125 by the manipulation of the user 220 in the wheel event processing subroutine, the display device 110 may perform a continuous operation when the average interval obtained based on the intervals present between the occurrence times of the wheel events is shorter than the reference interval. As an example, the display device 110 may perform a unit operation when wheel events failing to meet the reference number occur in the wheel input device 125 by the manipulation of the user 220 in the wheel event processing subroutine. As an example, the display device 110 may perform a unit operation when wheel events meeting the reference number occur in the wheel input device 125 by the manipulation of the user 220 in the wheel event processing subroutine, but the average interval is longer than the reference interval. As an example, the display device 110 may keep on performing the continuous operation when the average interval is longer than the reference interval, but the interval due to the last occurring wheel event is present in the buffer time period.

In operation 820, the display device 110 may determine whether a key event occurs in the key input device (e.g., the remote control 121 of FIG. 1). The key event may occur as the user 220 manipulates a button of the key input device 121. As an example, the key event may occur whenever the button is pressed by the user 220. The key event may be interpreted, e.g., as requesting to perform a unit operation or continuous operation depending on the manipulation scheme by the user 220.

According to an example, upon detecting that the key event occurs, the display device 110 may perform a key event processing subroutine for processing the key event in operation 840. For example, the display device 110 may perform a continuous operation according to a scheme in which the user 220 manipulates a button in the key event processing subroutine. For example, if a specific button is pressed for a predetermined time (e.g., 350 ms), and a key event that the button is pressed every predetermined interval (70 ms) repeatedly occurs, the display device 110 may recognize it as a command to request to perform a continuous operation. For the key event failing to meet the requirement, the display device 110 may recognize it as a command to request to perform a unit operation.

Figure 9:
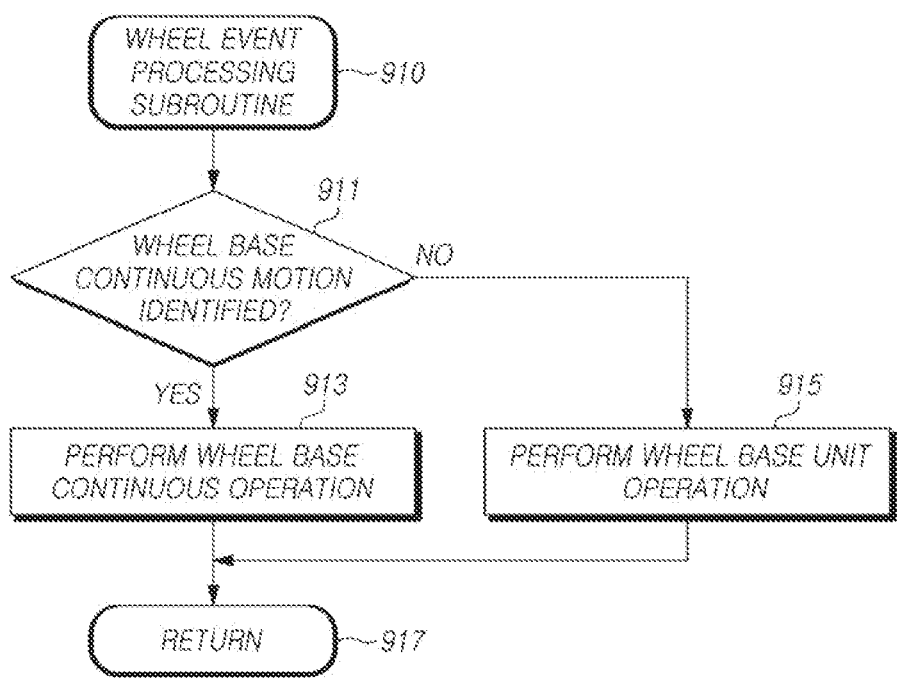
FIG. 9 is a control flowchart illustrating a subroutine for processing a wheel event in a display device according to an embodiment of the disclosure.

FIG. 9 is a control flowchart illustrating a subroutine (e.g., the wheel event processing subroutine 830 of FIG. 8) for processing a wheel event in a display device (e.g., the display device 110 of FIG. 1) according to an embodiment of the disclosure.

Referring to FIG. 9, in operation 910, the display device 110 may initiate a wheel event subroutine. If the wheel event subroutine is initiated, the display device 110 may determine whether the wheel (e.g., the wheel 210 of FIG. 2) of the wheel input device (e.g., the wheel input device 125 of FIG. 1) by the user (e.g., the user 220 of FIG. 2) is manipulated by continuous motion in operation 911. As an example, upon recognizing the occurrence of wheel events (e.g., the forward wheel events 321, 323, 325, 327, and 329 or reverse wheel events 331, 333, 335, 337, and 339 of FIG. 3) meeting the reference number in the wheel input device 125, the display device 110 may obtain the average interval based on the intervals (e.g., the first to fourth forward intervals INTERVAL 1-1(341) to INTERVAL 1-4(347) or first to fourth reverse intervals INTERVAL 2-1(351) to INTERVAL 2-4(357) of FIG. 3) present between the occurrence times of the wheel events. The average interval may correspond to the quotient obtained by dividing the sum of the intervals by the number of intervals (e.g., the number of wheel event occurrences−1 (N−1=4)). As an example, if the average interval is shorter than the reference interval, the display device 110 may determine it as a wheel base continuous motion to request a continuous operation. As an example, if the number of wheel event occurrences fails to meet the reference number, the display device 110 may determine that it is not the wheel base continuous motion to request a continuous operation. As an example, if the average interval is longer than the reference interval, the display device 110 may determine that it is not the wheel base continuous motion to request a continuous operation.

Upon identifying it as the wheel base continuous motion, the display device 110 may perform a wheel base continuous operation in operation 913. In the wheel base continuous operation, e.g., when a plurality of items are arranged on the screen in the horizontal direction, the currently selected item may be slid to the right or left corresponding to the wheel event occurring direction (e.g., clockwise (a) 320 or counterclockwise (b) 330 of FIG. 3), selecting a specific item by the continuous movement.

Upon identifying that it is not the wheel base continuous motion, the display device 110 may perform a wheel base unit operation in operation 915. In the wheel base unit operation, e.g., when a plurality of items are arranged on the screen in the horizontal direction, an item disposed in the next position to the currently selected item to the right or left corresponding to the wheel event occurring direction (e.g., clockwise (a) 320 or counterclockwise (b) 330 of FIG. 3) may be selected.

Figure 10:
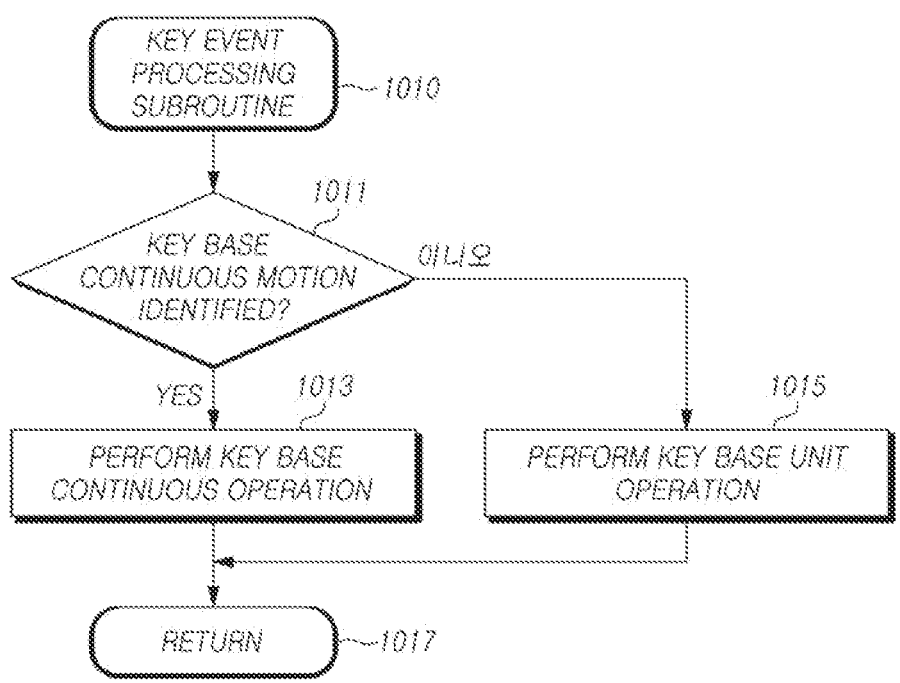
FIG. 10 is a control flowchart illustrating a subroutine for processing a key event in a display device according to an embodiment of the disclosure.

FIG. 10 is a control flowchart illustrating a subroutine (e.g., the key event processing subroutine 840 of FIG. 8) for processing a key event in a display device (e.g., the display device 110 of FIG. 1) according to an embodiment of the disclosure.

Referring to FIG. 10, in operation 1010, the display device 110 may initiate a key event subroutine. If the key event subroutine is initiated, the display device 110 may determine whether the key event occurring in the key input device (e.g., the remote control 121 of FIG. 1) is caused by the manipulation corresponding to the key base continuous motion in operation 1011. As an example, the display device 110 may identify whether it is the key base continuous motion to request a continuous operation by the scheme of manipulating the button by the user 220. For example, if a specific button is pressed for a predetermined time (e.g., 350 ms), and a key event that the button is pressed every predetermined interval (70 ms) repeatedly occurs, the display device 110 may recognize it as the key base continuous motion. For the key event failing to meet the requirement, the display device 110 may recognize it as a command to request to perform a unit operation.

Upon identifying it as the key base continuous motion, the display device 110 may perform a key base continuous operation in operation 1013. In the key base continuous operation, e.g., when a plurality of items are arranged on the screen in the horizontal direction, the currently selected item may be slid to the right or left corresponding to the direction button that has generated the key event, selecting a specific item by the continuous movement.

Upon identifying that it is not the key base continuous motion, the display device 110 may perform a key base unit operation in operation 1015. In the key base unit operation, e.g., when a plurality of items are arranged on the screen in the horizontal direction, an item disposed in the next position to the currently selected item to the right or left corresponding to the direction button having caused the key event may be selected.

FIG. 11 is a control flowchart illustrating an example of processing a wheel event in a display device (e.g., the display device 110 of FIG. 1) according to an embodiment of the disclosure.

Referring to FIG. 11, in operation 1111, the display device 110 may determine whether a wheel event occurs in the wheel input device (e.g., the wheel input device 125 of FIG. 1). The wheel event may occur as the user (e.g., the user 220 of FIG. 1) rotates (e.g., as indicated by the arrow 234 of FIG. 2) the wheel (e.g., the wheel 210 of FIG. 2) of the wheel input device 125 in either the forward direction (e.g., clockwise (a) 320 of FIG. 3) or reverse direction (e.g., counterclockwise (b) 330 of FIG. 3). For example, the wheel event may correspond to the occurrence of a tick signal whenever the wheel 210 is rotated a predetermined angle by the user. The predetermined angle may be set considering the sensitivity of the wheel operation. The sensitivity of the wheel operation may be increased as the angle to detect the occurrence of the wheel event is decreased. The sensitivity of the wheel operation may be decreased as the angle to detect the occurrence of the wheel event is increased. One or several continuous wheel events may occur in the rotation range (e.g., the forward rotation range 360 or reverse rotation range 370 of FIG. 3) corresponding to the distance or angle of the wheel 210 as the user 220 manipulates it once. In the following description, it is assumed that several wheel events occur in the rotation ranges 360 and 370. If only one wheel event occurred in the rotation ranges 360 and 370, the display device 110 would perform the unit operation once. In other words, with one wheel event, the display device 110 would not perform a continuous operation.

According to an example, the display device 110 may receive wheel event data from the wheel input device 125 and detect the occurrence of a wheel event based on the wheel event data. The wheel event data may be configured by the wheel input device 125 due to the occurrence of at least one wheel event by the manipulation of the wheel 210 by the user 220. The wheel event data may include information regarding the wheel event. The information regarding the wheel event may include, e.g., identification information indicating the rotation direction, the number of wheel events, and/or inter-wheel event interval information. The identification information indicating the rotation direction may be information indicating the rotation direction (e.g., clockwise (a) 320 of FIG. 3 or the reverse direction (e.g., counterclockwise (b) 330 of FIG. 3)) of the wheel 210 by the manipulation of the user 220. The number of wheel events may be, e.g., information indicating the number of tick signals generated in one rotation ranges 360 and 370. The inter-wheel event interval information may be, e.g., the time interval between wheel events occurring in one rotation range 360 or 370, i.e., the interval (e.g., the forward intervals 341, 343, 345, and 347 or reverse intervals 351, 353, 355, and 357 of FIG. 3). The intervals may be the same, similar, or different for each wheel event. The interval may be considered to predict the rotation speed of the wheel 210 by the manipulation of the user 220. For example, if five wheel events occur in one rotation range 360 or 370, the display device 110 may determine that the wheel event occurs corresponding to each of the five wheel events.

Upon determining that the wheel event occurs, the display device 110 may increase (n+1) the count value n to count the number of wheel events occurring in one rotation range 360 or 370 in operation 1113. The count value may be considered for the display device 110 to determine whether the manipulation of the wheel 210 by the user 220 is performed as continuous motion. In operation 1115, the display device 110 may determine whether the number of wheel events detected thus far is the reference number N. The reference number N may be preset to determine the continuous motion. As an example, upon detecting that four wheel events continuously occur, the display device 110 may determine that the wheel 210 has been manipulated as continuous motion by the user

220. If four wheel events continuously occur, the display device 110 may obtain three intervals.

If the number n of the wheel events detected thus far is less than the reference number N, the display device 110 may perform a unit operation in operation 1121. The unit operation may be, e.g., an operation in which when a plurality of items are arranged on the screen in the horizontal direction, an item disposed in the next position to the currently selected item to the right or left corresponding to the wheel event occurring direction (e.g., clockwise (a) 320 or counterclockwise (b) 330) is selected.

If the number n of wheel events detected thus far is the reference number N or more, the display device 110 may obtain the average interval in operation 1117. As an example, the average interval may be the quotient obtained by dividing the sum of the reference number n−1 of, or more, intervals (e.g., the first to fourth forward intervals INTERVAL 1-1(341) to INTERVAL 1-4(347) or first to fourth reverse intervals INTERVAL 2-1(351) to INTERVAL 2-4(357) by the number of intervals (e.g., the number of wheel event occurrences−1 (n−1)).

In operation 1119, the display device 110 may determine whether the average interval is smaller than the reference interval. The average interval being smaller than the reference interval leads to the prediction that the average rotation speed of the wheel 210 by the manipulation by the user 220 in one rotation range is higher than a speed serving as a reference (e.g., the reference speed) for determining the continuous motion. The average interval being not smaller than the reference interval leads to the prediction that the average rotation speed is equal to or lower than the reference speed.

If the average interval is not smaller than the reference interval, the display device 110 may perform a unit operation in operation 1121. The unit operation may be, e.g., an operation in which when a plurality of items are arranged on the screen in the horizontal direction, an item disposed in the next position to the currently selected item to the right or left corresponding to the wheel event occurring direction (e.g., clockwise (a) 320 or counterclockwise (b) 330) is selected.

If the average interval is smaller than the reference interval, the display device 110 may perform a continuous operation in operation 1123. The continuous operation may be, e.g., an operation in which when a plurality of items are arranged on the screen in the horizontal direction, the currently selected item may be slid in the direction (e.g., right or left direction) corresponding to the wheel event occurring direction (e.g., clockwise (a) 320 or counterclockwise (b) 330), selecting a specific item by the continuous movement.

According to an example, the display device 110 may determine whether an additional wheel event occurs in operation 1127. The additional wheel event may be a wheel event (e.g., the fifth or sixth wheel event 1235 or 1236 of FIG. 12B) detected after the operation type of the display device 110 is determined as the continuous operation. Upon determining that the additional wheel event occurs, the display device 110 may obtain an updated average interval further considering the interval according to the additional wheel event in operation 1129. In operation 1131, the display device 110 may compare the updated average interval with the reference interval and, according to the result, maintain the continuous operation or stop the continuous operation to return to the unit operation. As an example, if the updated average interval is smaller than the reference interval, the display device 110 may maintain the continuous operation. Unless the updated average interval is otherwise smaller than the reference interval, the display device 110 may stop the continuous operation and perform a unit operation in operation 1133.

According to an example, the display device 110 may determine whether the buffer time period elapses before the additional wheel event occurs or the updated average interval is smaller than the reference interval but the buffer time period elapses in operation 1125. If the buffer time period elapses before the additional wheel event occurs or the updated average interval is smaller than the reference interval but the buffer time period elapses, the display device 110 may stop the continuous operation and perform a unit operation in operation 1133. Otherwise, if the buffer time period does not elapses before the additional wheel event occurs or the updated average interval is smaller than the reference interval but the buffer time period does not elapse, the display device 110 may maintain the continuous operation.

Figure 12A:
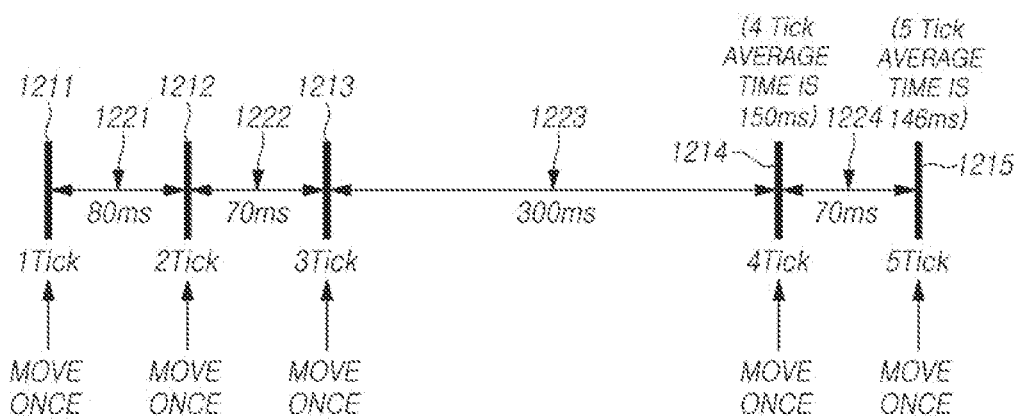
FIG. 12A is an example view illustrating a wheel event signal for continuously performing a unit operation in a rotation range in a display device according to an embodiment of the disclosure.

FIG. 12A is an example view illustrating a wheel event signal for continuously performing a unit operation in a rotation range (e.g., the forward rotation range 360 or reverse rotation range 370 of FIG. 3) in a display device (e.g., the display device 110 of FIG. 1) according to an embodiment of the disclosure.

Referring to FIG. 12A, as an example, the wheel event signal is generated by the wheel input device 125 in one rotation range 360 or 370. The wheel event signal may include five wheel events 1211, 1212, 1213, 1214, and 1215 generated in one rotation range 360 or 370. The five wheel events 1211, 1212, 1213, 1214, and 1215 may correspond to, e.g., tick signals 1Tick, 2Tick, 3Tick, 4Tick, or 5Tick, respectively. The five wheel events 1211, 1212, 1213, 1214, and 1215 may include a first wheel event 1211, a second wheel event 1212, a third wheel event 1213, a fourth wheel event 1214, or a fourth wheel event 1215.

For example, there may be intervals 1221, 1222, 1223, and 1224, which are time intervals, between the five wheel events 1211, 1212, 1213, 1214, and 1215. The intervals 1221, 1222, 1223, and 1224 may include a first interval 1221, a second interval 1222, a third interval 1222, or a fourth interval 1224. The first interval 1221 may be a time interval (e.g., 80 ms) between the first wheel event 1211 and the second wheel event 1212. The second interval 1222 may be a time interval (e.g., 70 ms) between the second wheel event 1212 and the third wheel event 1213. The third interval 1223 may be a time interval (e.g., 300 ms) between the third wheel event 1213 and the fourth wheel event 1214. The fourth interval 1224 may be a time interval (e.g., 70 ms) between the fourth wheel event 1214 and the fifth wheel event 1215.

According to an example, when the number of intervals obtained is less than a reference number (e.g., N=3), the display device 110 may determine that the manipulation of the wheel 210 of the wheel input device 125 by the user (e.g., the user 220 of FIG. 2) does not correspond to a continuous motion. The continuous motion means that manipulation of the wheel 210 by the user is performed to allow the wheel event to continuously occur. Accordingly, since the two intervals obtained by the occurrence of the first to third wheel events 1211, 1212, and 1213 are less than the reference number (e.g., N=3), the display device 110 determines that the occurrence of each of the first wheel event 1211, the second wheel event 1212, or the third wheel event 1213 is caused by unit motion, rather than continuous motion. The display device 110 may perform a unit operation (e.g., move once to select the next item (or object)) corresponding to each of the first wheel event 1211, the second wheel event 1212, or the third wheel event 1213 determined to be caused by unit motion. The display device 110 may use the accrued number of wheel event occurrences instead of the number of intervals. The display device 110 needs to set the reference number to be one larger (N+1) when using the accrued number of wheel events rather than when using the number of intervals. For example, if the reference number is 3 when the number of intervals is used, the reference number may be 4 when the accrued number of wheel events is used.

According to an example, when the number of intervals obtained is the reference number (e.g., N=3) or more, the display device 110 may determine that the manipulation of the wheel 210 of the wheel input device 125 by the user 220 corresponds to a continuous motion. The continuous motion means that manipulation of the wheel 210 by the user is performed to allow the wheel event to continuously occur.

As an example, since the three intervals obtained by the occurrence of the first to fourth wheel events 1211, 1212, 1213, and 1214 are the reference number (e.g., N=3) or more, the display device 110 determines that the occurrence of each of the fourth wheel event 1214 is caused by continuous motion, rather than unit motion. The display device 110 may obtain the average interval ($I_{average}$) of the first interval ($I_{event\ \#1}$) 1221 (e.g., 80 ms), the second interval ($I_{event\ \#2}$) 1222 (e.g., 70 ms), and the third interval ($I_{event\ \#3}$) 1223 (e.g., 300 ms) determined to be caused by continuous motion. The average interval ($I_{average}$) (e.g., 150 ms) may be obtained by '(first interval ($I_{event\ \#1}$)(80 ms)+second interval ($I_{event\ \#2}$)(70 ms)+third interval ($I_{event\ \#3}$) (300 ms))/number 3 of event occurrences of events'. The display device 110 may compare the average interval ($I_{average}$) (e.g., 150 ms) with the reference interval ($I_{reference}$) (e.g., 90 ms), determining whether the wheel 210 is rotated rapidly by the manipulation of the user 220. The reference interval ($I_{reference}$) may be preset as a reference for determining continuous movement. Since the average interval ($I_{average}$) (e.g., 150 ms) is larger than the reference interval ($I_{reference}$) (e.g., 90 ms), the display device 110 may determine that the wheel 210 is rotated not rapidly by the manipulation of the user 220. In this case, the display device 110 may also perform a unit operation (e.g., move once to select the next item (or object)) on the fourth wheel event 1214 continuously from the first to third wheel events 1211, 1212, and 1213.

As an example, since the four intervals obtained by the occurrence of the fifth wheel event 1215 continuously from the first to fourth wheel events 1211, 1212, 1213, and 1214 are the reference number (e.g., N=3) or more, the display device 110 determines that the occurrence of the fifth wheel event 1215 is caused by continuous motion, rather than unit motion. The display device 110 may obtain the average interval ($I_{average}$) of the first interval ($I_{event\ \#1}$) 1221 (e.g., 80 ms), the second interval ($I_{event\ \#2}$) 1222 (e.g., 70 ms), the third interval ($I_{event\ \#3}$) 1223 (e.g., 300 ms), and the fourth interval ($I_{event\ \#4}$) 1224 (e.g., 70 ms) determined to be caused by continuous motion. The average interval ($I_{average}$) (e.g., 146 ms) may be obtained by '(first interval ($I_{event\ \#1}$)(80 ms)+second interval ($I_{event\ \#2}$)(70 ms)+third interval ($I_{event\ \#3}$) (300 ms)+fourth interval ($I_{event\ \#4}$) (70 ms))/ number 4 of event occurrences of events'. The display device 110 may compare the average interval ($I_{average}$) (e.g., 146 ms) with the reference interval ($I_{reference}$) (e.g., 90 ms), determining whether the wheel 210 is rotated rapidly by the manipulation of the user 220. The reference interval ($I_{reference}$) may be preset as a reference for determining continuous movement. Since the average interval ($L_{average}$) (e.g., 146 ms) is larger than the reference interval ($I_{reference}$) (e.g., 90 ms), the display device 110 may determine that the wheel 210 is rotated not rapidly by the manipulation of the user 220. In this case, the display device 110 may also perform a unit operation (e.g., move once to select the next item (or object)) on the fifth wheel event 1215 continuously from the first to fourth wheel events 1211, 1212, 1213, and 1214.

Figure 12B:
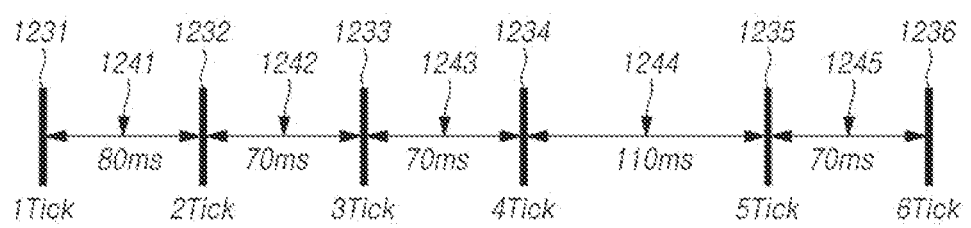
FIG. 12B is an example view illustrating a wheel event signal for changing an operation in a rotation range in a display device according to an embodiment of the disclosure.

FIG. 12B is an example view illustrating a wheel event signal for changing an operation in a rotation range (e.g., the forward rotation range 360 or reverse rotation range 370 of FIG. 3) in a display device (e.g., the display device 110 of FIG. 1) according to an embodiment of the disclosure.

Referring to FIG. 12B, as an example, the wheel event signal is generated by the wheel input device (e.g., the wheel input device 125) in one rotation range 360 or 370. The wheel event signal may include six wheel events 1231, 1232, 1233, 1234, 1235, and 1236 generated in one rotation range 360 or 370. The six wheel events 1231, 1232, 1233, 1234, and 1235 may correspond to, e.g., tick signals 1Tick, 2Tick, 3Tick, 4Tick, 5Tick, or 6Tick, respectively. The six wheel events 1231, 1232, 1233, 1234, and 1235 may include a first wheel event 1231, a second wheel event 1232, a third wheel event 1233, a fourth wheel event 1234, a fifth wheel event 1235 or a sixth wheel event 1236.

For example, there may be intervals 1241, 1242, 1243, 1244, and 1245, which are time intervals, between the six wheel events 1231, 1232, 1233, 1234, and 1235. The intervals 1241, 1242, 1243, 1244, and 1245 may include a first interval 1241, a second interval 1242, a third interval 1243, a fourth interval 1244, or a fifth interval 1245. The first interval 1241 may be a time interval (e.g., 80 ms) between the first wheel event 1231 and the second wheel event 1232. The second interval 1242 may be a time interval (e.g., 70 ms) between the second wheel event 1232 and the third wheel event 1233. The third interval 1243 may be a time interval (e.g., 70 ms) between the third wheel event 1233 and the fourth wheel event 1234. The fourth interval 1244 may be a time interval (e.g., 110 ms) between the fourth wheel event 1234 and the fifth wheel event 1235. The fifth interval 1245 may be a time interval (e.g., 70 ms) between the fifth wheel event 1235 and the sixth wheel event 1236.

According to an example, when the number of intervals obtained is less than a reference number (e.g., N=3), the display device 110 may determine that the manipulation of the wheel 210 of the wheel input device 125 by the user (e.g., the user 220 of FIG. 2) does not correspond to a continuous motion. The continuous motion means that manipulation of the wheel 210 by the user is performed to allow the wheel event to continuously occur. Accordingly, since the two intervals obtained by the occurrence of the first to third wheel events 1231, 1232, and 1233 are less than the reference number (e.g., N=3), the display device 110 determines that the occurrence of each of the first wheel event 1231, the second wheel event 1232, or the third wheel event 1233 is caused by unit motion, rather than continuous motion. The display device 110 may perform a unit operation (e.g., move once to select the next item (or object)) corresponding to each of the first wheel event 1231, the second wheel event 1232, or the third wheel event 1233 determined to be caused by unit motion. The display device 110 may use the accrued number of wheel event occurrences instead of the number of intervals. The display device 110 needs to set the reference number to be one larger (N+1) when using the accrued number of wheel events rather than when using the number of intervals. For example, if the reference number is 3 when the number of intervals is used, the reference number may be 4 when the accrued number of wheel events is used.

According to an example, when the number of intervals obtained is the reference number (e.g., N=3) or more, the display device 110 may determine that the manipulation of the wheel 210 of the wheel input device 125 by the user 220 corresponds to a continuous motion. The continuous motion means that manipulation of the wheel 210 by the user is performed to allow the wheel event to continuously occur.

As an example, since the three intervals obtained by the occurrence of the first to fourth wheel events 1231, 1232, 1233, and 1234 are the reference number (e.g., N=3) or more, the display device 110 determines that the occurrence of each of the fourth wheel event 1234 is caused by continuous motion, rather than unit motion. The display device 110 may obtain the average interval ($I_{average}$) of the first interval ($I_{event\ \#1}$) 1241 (e.g., 80 ms), the second interval ($I_{event\ \#2}$) 1242 (e.g., 70 ms), and the third interval ($I_{event\ \#3}$) 1243 (e.g., 70 ms) determined to be caused by continuous motion. The average interval ($I_{average}$) (e.g., 73.33 ms) may be obtained by '(first interval ($I_{event\ \#1}$)(80 ms)+second interval ($I_{event\ \#2}$)(70 ms)+third interval ($I_{event\ \#3}$) (70 ms))/number 3 of event occurrences of events'. The display device 110 may compare the average interval ($I_{average}$) (e.g., 73.33 ms) with the reference interval ($I_{reference}$) (e.g., ms), determining whether the wheel 210 is rotated rapidly by the manipulation of the user 220. The reference interval ($I_{reference}$) may be preset as a reference for determining continuous movement. Since the average interval ($I_{average}$) (e.g., 73.33 ms) is not larger than the reference interval ($I_{reference}$) (e.g., 90 ms), the display device 110 may determine that the wheel 210 is rotated rapidly by the manipulation of the user 220. In this case, the display device 110 may stop the unit operation performed on the first to third wheel events 1231, 1232, and 1233 and perform a continuous operation (e.g., selection while skipping several items (or objects) by slide) on the fourth wheel event 1234.

As an example, since the four intervals obtained by the occurrence of the fifth wheel event 1235 continuously from the first to fourth wheel events 1231, 1232, 1233, and 1234 are the reference number (e.g., N=3) or more, the display device 110 determines that the occurrence of the fifth wheel event 1235 is caused by continuous motion, rather than unit motion. The display device 110 may obtain the average interval ($I_{average}$) of the first interval ($I_{event\ \#1}$) 1241 (e.g., 80 ms), the second interval ($I_{event\ \#2}$) 1242 (e.g., 70 ms), the third interval ($I_{event\ \#3}$) 1243 (e.g., 70 ms), and the fourth interval ($I_{event\ \#3}$) 1244 (e.g., 110 ms) determined to be caused by continuous motion. The average interval ($I_{average}$) (e.g., 82.5 ms) may be obtained by '(first interval ($I_{event\ \#1}$)(80 ms)+second interval ($I_{event\ \#2}$)(70 ms)+third interval ($I_{event\ \#3}$) (70 ms)+fourth interval ($I_{event\ \#4}$) (110 ms))/number 4 of event occurrences of events'. The display device 110 may compare the average interval ($I_{average}$) (e.g., 82.5 ms) with the reference interval ($I_{reference}$) (e.g., 90 ms), determining whether the wheel 210 is rotated rapidly by the manipulation of the user 220. The reference interval ($I_{reference}$) may be preset as a reference for determining continuous movement. Since the average interval ($I_{average}$) (e.g., 82.5 ms) is not larger than the reference interval ($I_{reference}$) (e.g., 90 ms), the display device 110 may determine that the wheel 210 is rotated rapidly by the manipulation of the user 220. In this case, the display device 110 may also perform a continuous operation (e.g., selects while skipping several items (or objects) by slide) on the fifth wheel event 1235 continuously from the first to fourth wheel events 1231, 1232, 1233, and 1234.

As an example, since the five intervals obtained by the occurrence of the sixth wheel event 1236 continuously from the first to fifth wheel events 1232, 1233, 1234, and 1235 are the reference number (e.g., N=3) or more, the display device 110 determines that the occurrence of the sixth wheel event 1236 is caused by continuous motion, rather than unit motion. The display device 110 may obtain the average interval ($I_{average}$) of the first interval ($I_{event\ \#1}$) 1241 (e.g., 80 ms), the second interval ($I_{event\ \#2}$) 1242 (e.g., 70 ms), the third interval ($I_{event\ \#3}$) 1243 (e.g., 70 ms), the fourth interval ($I_{event\ \#4}$) 1244 (e.g., 110 ms), and the fifth interval ($I_{event\ \#4}$) 1245 (e.g., 70 ms) determined to be caused by continuous motion. The average interval ($I_{average}$) (e.g., 80 ms) may be obtained by '(first interval ($I_{event\ \#1}$)(80 ms)+second interval ($I_{event\ \#2}$)(70 ms)+third interval ($I_{event\ \#3}$) (70 ms)+fourth interval ($I_{event\ \#4}$) (110 ms)+fifth interval ($I_{event\ \#5}$) (70 ms))/number 5 of event occurrences of events'. The display device 110 may compare the average interval ($I_{average}$) (e.g., 80 ms) with the reference interval ($I_{reference}$) (e.g., 90 ms), determining whether the wheel 210 is rotated rapidly by the manipulation of the user 220. The reference interval ($I_{reference}$) may be preset as a reference for determining continuous movement. Since the average interval ($I_{average}$) (e.g., 80 ms) is not larger than the reference interval ($I_{reference}$) (e.g., 90 ms), the display device 110 may determine that the wheel 210 is rotated rapidly by the manipulation of the user 220. In this case, the display device 110 may also perform a continuous operation (e.g., selects while skipping several items (or objects) by slide) on the sixth wheel event 1236 continuously from the first to fifth wheel events 1231, 1232, 1233, 1234, and 1235.

Figure 12C:
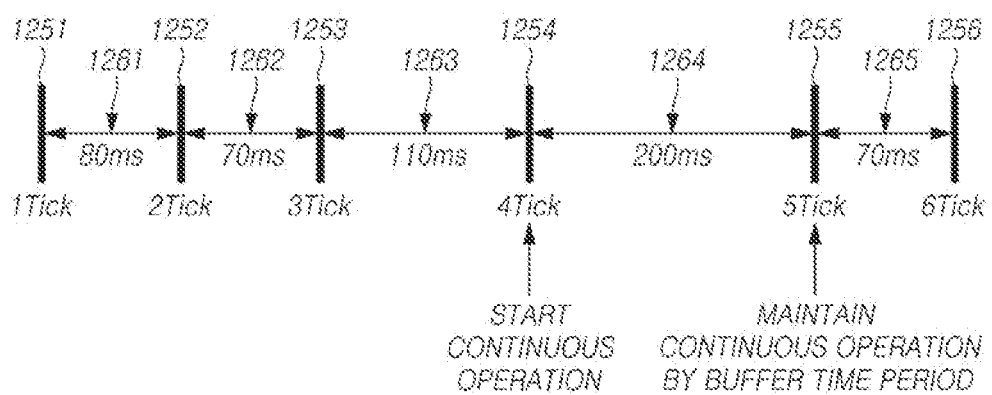
FIG. 12C is an example view illustrating a wheel event signal for maintaining a continuous operation in a rotation range in a display device according to an embodiment of the disclosure.

FIG. 12C is an example view illustrating a wheel event signal for maintaining a continuous operation in a rotation range (e.g., the forward rotation range 360 or reverse rotation range 370 of FIG. 3) in a display device (e.g., the display device 110 of FIG. 1) according to an embodiment of the disclosure.

Referring to FIG. 12C, as an example, the wheel event signal is generated by the wheel input device (e.g., the wheel input device 125) in one rotation range 360 or 370. The wheel event signal may include six wheel events 1251, 1252, 1253, 1254, 1255, and 1256 generated in one rotation range 360 or 370. The six wheel events 1251, 1252, 1253, 1254, 1255, and 1256 may correspond to, e.g., tick signals 1Tick, 2Tick, 3Tick, 4Tick, 5Tick, or 6Tick, respectively. The six wheel events 1251, 1252, 1253, 1254, 1255, and 1256 may include a first wheel event 1251, a second wheel event 1252, a third wheel event 1253, a fourth wheel event 1254, a fifth wheel event 1255, or a sixth wheel event 1256.

For example, there may be intervals 1261, 1262, 1263, 1264, and 1265, which are time intervals, between the six wheel events 1251, 1252, 1253, 1254, 1255, and 1256. The intervals 1261, 1262, 1263, 1264, and 1265 may include a first interval 1261, a second interval 1262, a third interval 1263, a fourth interval 1264, or a fifth interval 1265. The first interval 1261 may be a time interval (e.g., 80 ms) between the first wheel event 1251 and the second wheel event 1252. The second interval 1262 may be a time interval (e.g., 70 ms) between the second wheel event 1252 and the third wheel event 1253. The third interval 1263 may be a time interval (e.g., 110 ms) between the third wheel event 1253 and the fourth wheel event 1254. The fourth interval 1264 may be a time interval (e.g., 200 ms) between the fourth wheel event 1254 and the fifth wheel event 1255. The fifth interval 1265 may be a time interval (e.g., between the fifth wheel event 1255 and the sixth wheel event 1256.

According to an example, when the number of intervals obtained is less than a reference number (e.g., N=3), the display device 110 may determine that the manipulation of the wheel 210 of the wheel input device 125 by the user (e.g., the user 220 of FIG. 2) does not correspond to a continuous motion. The continuous motion means that manipulation of the wheel 210 by the user is performed to allow the wheel event to continuously occur. Accordingly, since the two intervals obtained by the occurrence of the first to third wheel events 1251, 1252, and 1253 are less than the reference number (e.g., N=3), the display device 110 determines that the occurrence of each of the first wheel event 1251, the second wheel event 1252, or the third wheel event 1253 is caused by unit motion, rather than continuous motion. The display device 110 may perform a unit operation (e.g., move once to select the next item (or object)) corresponding to each of the first wheel event 1251, the second wheel event 1252, or the third wheel event 1253 determined to be caused by unit motion. The display device 110 may use the accrued number of wheel event occurrences instead of the number of intervals. The display device 110 needs to set the reference number to be one larger (N+1) when using the accrued number of wheel events rather than when using the number of intervals. For example, if the reference number is 3 when the number of intervals is used, the reference number may be 4 when the accrued number of wheel events is used.

According to an example, when the number of intervals obtained is the reference number (e.g., N=3) or more, the display device 110 may determine that the manipulation of the wheel 210 of the wheel input device 125 by the user 220 corresponds to a continuous motion. The continuous motion means that manipulation of the wheel 210 by the user is performed to allow the wheel event to continuously occur.

As an example, since the three intervals obtained by the occurrence of the first to fourth wheel events 1251, 1252, 1253, and 1254 are the reference number (e.g., N=3) or more, the display device 110 determines that the occurrence of each of the fourth wheel event 1254 is caused by continuous motion, rather than unit motion. The display device 110 may obtain the average interval ($I_{average}$) of the first interval ($I_{event\ \#1}$) 1261 (e.g., 80 ms), the second interval ($I_{event\ \#2}$) 1262 (e.g., 70 ms), and the third interval ($I_{event\ \#3}$) 1263 (e.g., 110 ms) determined to be caused by continuous motion. The average interval ($I_{average}$) (e.g., 86.66 ms) may be obtained by '(first interval ($I_{event\ \#1}$))(80 ms)+second interval ($I_{event\ \#2}$)(70 ms)+third interval ($I_{event\ \#3}$) (110 ms))/ number 3 of event occurrences of events'. The display device 110 may compare the average interval ($I_{average}$) (e.g., 86.66 ms) with the reference interval ($I_{reference}$) (e.g., 90 ms), determining whether the wheel 210 is rotated rapidly by the manipulation of the user 220. The reference interval ($I_{reference}$) may be preset as a reference for determining continuous movement. Since the average interval ($I_{average}$) (e.g., 86.66 ms) is not larger than the reference interval ($I_{reference}$) (e.g., 90 ms), the display device 110 may determine that the wheel 210 is rotated rapidly by the manipulation of the user 220. In this case, the display device 110 may stop the unit operation performed on the first to third wheel events 1251, 1252, and 1253 and perform a continuous operation (e.g., selection while skipping several items (or objects) by slide) on the fourth wheel event 1254.

As an example, since the four intervals obtained by the occurrence of the fifth wheel event 1255 continuously from the first to fourth wheel events 1251, 1252, 1253, and 1254 are the reference number (e.g., N=3) or more, the display device 110 determines that the occurrence of the fifth wheel event 1255 is caused by continuous motion, rather than unit motion. The display device 110 may obtain the average interval ($I_{average}$) of the first interval ($I_{event\ \#1}$) 1261 (e.g., 80 ms), the second interval ($I_{event\ \#2}$) 1262 (e.g., 70 ms), the third interval ($I_{event\ \#3}$) 1263 (e.g., 110 ms), and the fourth interval ($I_{event\ \#4}$) 1264 (e.g., 200 ms) determined to be caused by continuous motion. The average interval ($I_{average}$) (e.g., 115 ms) may be obtained by '(first interval ($I_{event\ \#1}$))(80 ms)+second interval ($I_{event\ \#2}$)(70 ms)+third interval ($I_{event\ \#3}$) (110 ms)+fourth interval ($I_{event\ \#4}$) (200 ms))/ number 4 of event occurrences of events'. The display device 110 may compare the average interval ($I_{average}$) (e.g., 115 ms) with the reference interval ($I_{reference}$) (e.g., 90 ms), determining whether the wheel 210 is rotated rapidly by the manipulation of the user 220. The reference interval ($I_{reference}$) may be preset as a reference for determining continuous movement. Since the average interval ($I_{average}$) (e.g., 115 ms) is larger than the reference interval ($I_{reference}$) (e.g., 90 ms), the display device 110 may determine that the wheel 210 is rotated not rapidly by the manipulation of the user 220. In this case, the display device 110 may stop the continuous operation performed on the first to fourth wheel events 1251, 1252, 1253, and 1254 and perform a unit operation (e.g., move once to select the next item (or object)) on the fifth wheel event 1255. However, when a buffer time period defining a buffer time difference is applied, the result may be different. For example, if a buffer time period (e.g., 300 ms) is preset, the display device 110 may additionally determine whether the final interval (e.g., the fourth interval ($I_{event\ \#4}$) (200 ms)) meets the preset buffer time period (e.g., 300 ms) although the average interval ($I_{average}$) (e.g., 115 ms) is larger than the reference interval ($I_{reference}$) (e.g., 90 ms). As the average interval ($I_{average}$) (e.g., 115 ms) exceeds the reference interval ($I_{reference}$) (e.g., 90 ms), but the final interval (e.g., the fourth interval ($I_{event\ \#4}$) (200 ms) does not exceed the preset buffer time period (e.g., 300 ms), the display device 110 may also keep on performing the continuous operation (e.g., select while skipping several items (or objects) by slide) on the fifth wheel event 1255 continuously from the first to fourth wheel events 1251, 1252, 1253, and 1254.

As an example, since the five intervals obtained by the occurrence of the sixth wheel event 1256 continuously from the first to fifth wheel events 1251, 1252, 1253, 1254, and 1255 are the reference number (e.g., N=3) or more, the display device 110 determines that the occurrence of the sixth wheel event 1256 is caused by continuous motion, rather than unit motion. The display device 110 may obtain the average interval ($I_{average}$) of the first interval ($I_{event\ \#1}$) 1261 (e.g., 80 ms), the second interval ($I_{event\ \#2}$) 1262 (e.g., 70 ms), the third interval ($I_{event\ \#3}$) 1263 (e.g., 110 ms), the fourth interval ($I_{event\ \#4}$) 1264 (e.g., 200 ms), and the fifth interval ($I_{event\ \#4}$) 1265 (e.g., 70 ms) determined to be caused by continuous motion. The average interval ($I_{average}$) (e.g., 90 ms) may be obtained by '(first interval ($I_{event\ \#1}$)(80 ms)+second interval ($I_{event\ \#2}$)(70 ms)+third interval ($I_{event\ \#3}$) (110 ms)+fourth interval ($I_{event\ \#4}$) (200 ms)+fifth interval ($I_{event\ \#5}$) (70 ms))/number 5 of event occurrences of events'. The display device 110 may compare the average interval ($I_{average}$) (e.g., 90 ms) with the reference interval ($I_{reference}$) (e.g., 90 ms), determining whether the wheel 210 is rotated rapidly by the manipulation of the user 220. The reference interval ($I_{reference}$) may be preset as a reference for determining continuous movement. Since the average interval ($I_{average}$) (e.g., 90 ms) is not larger than the reference interval ($I_{reference}$) (e.g., 90 ms), the display device 110 may determine that the wheel 210 is rotated rapidly by the manipulation of the user 220. In this case, the display device 110 may also perform a continuous operation (e.g., selects while skipping several items (or objects) by slide) on the sixth wheel event 1236 continuously from the first to fifth wheel events 1251, 1252, 1253, 1254, and 1255.

Figure 13A:
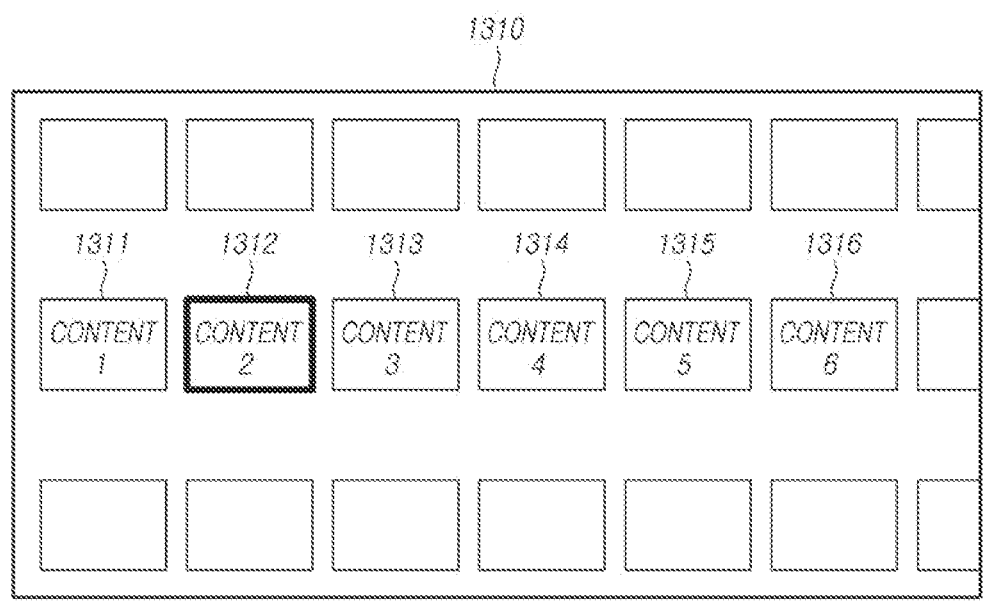
FIG. 13A is a view illustrating an initial screen displaying a plurality of items on a display device according to an embodiment of the disclosure.

FIG. 13A is a view illustrating an initial screen displaying a plurality of items on a display device (e.g., the display device 110 of FIG. 1) according to an embodiment of the disclosure.

Referring to FIG. 13A, as an example, the display device 110 may arrange a plurality of items (e.g., content 1 1311, content 2 1312, content 3 1313, content 4 1314, content 1315, and content 6 1316) on the display 1310 in a horizontal direction. The display device 110 may configure a screen such that a plurality of item rows are arranged in the horizontal direction.

Figure 13B:
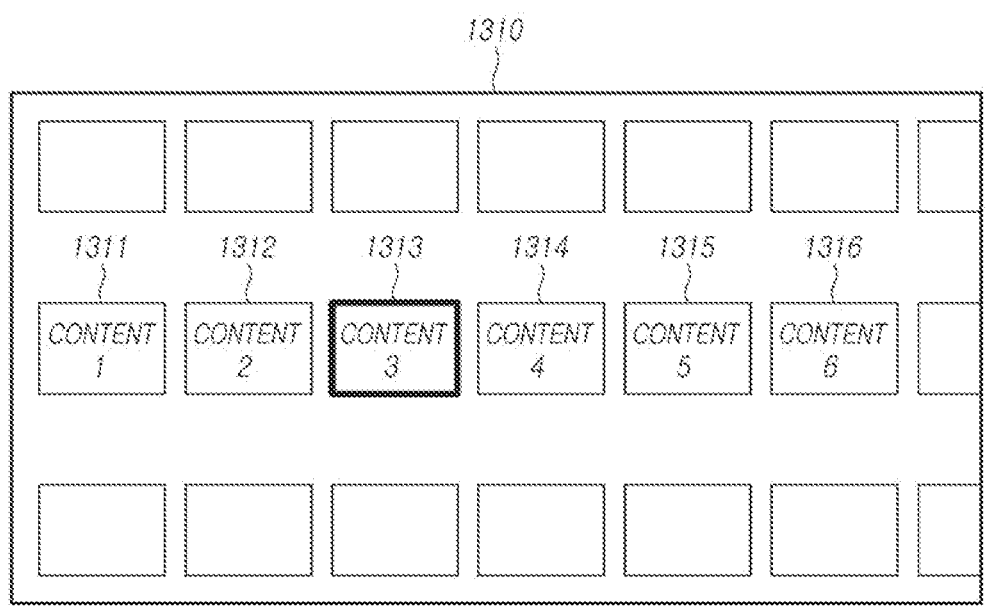
FIG. 13B is a view illustrating a screen where an item is selected by a unit operation in a display device according to an embodiment of the disclosure.

FIG. 13B is a view illustrating a screen where an item is selected by a unit operation in a display device (e.g., the display device 110 of FIG. 1) according to an embodiment of the disclosure.

Referring to FIG. 13B, as an example, the display device 110 may perform a unit operation when wheel events not exceeding a reference number occur or when wheel events exceeding the reference number occur, but the rotation speed does not exceed a reference speed. For example, the unit operation may output a screen 1310 in which, when a plurality of items (e.g., content 1 1311, content 2 1312, content 3 1313, content 4 1314, content 1315, and content 6 1316) are arranged on the screen in the horizontal direction, an item (content 3 1313) disposed in the next position to the currently selected item (content 2 1312) to the right corresponding to the wheel event occurring forward direction (e.g., clockwise (a) 320) is selected.

Figure 13C:
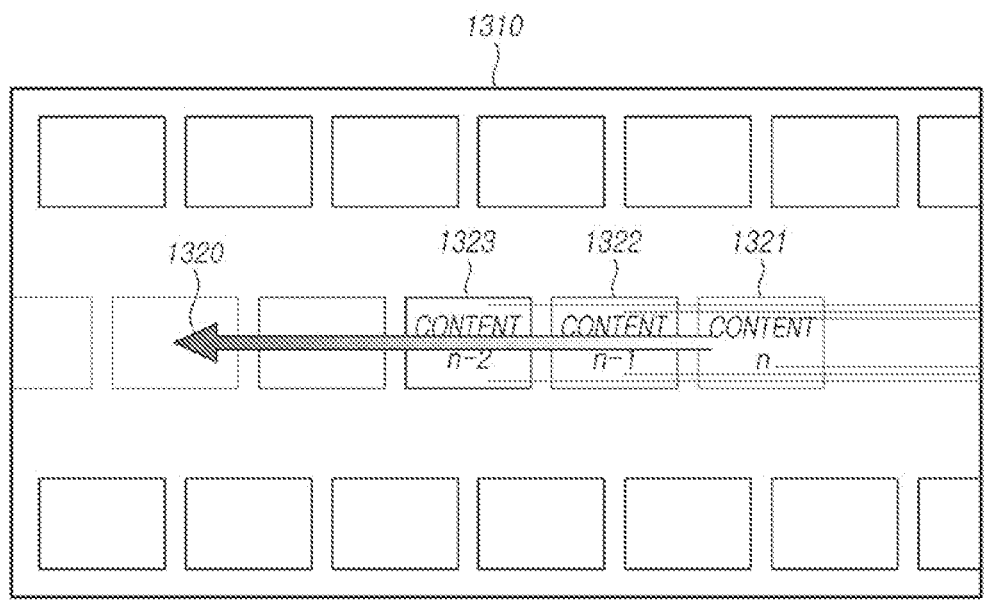
FIG. 13C is a view illustrating a screen where an item displayed on a screen is slid by a continuous operation in a display device according to an embodiment of the disclosure.

FIG. 13C is a view illustrating a screen where an item displayed on a screen is slid by a continuous operation in a display device (e.g., the display device 110 of FIG. 1) according to an embodiment of the disclosure.

Referring to FIG. 13C, as an example, when the average speed according to the rotation of the wheel (e.g., the wheel 210 of FIG. 2) having caused wheel events exceeding the reference number exceeds the reference speed, the display device 110 may perform a continuous operation. For example, the continuous operation may output a screen 1310 in which on an initial screen (the screen shown in FIG. 13A) in which a plurality of items (e.g., content 1 1311, content 2 1312, content 3 1313, content 4 1314, content 5, 1315, and content 6 1316)) are arranged on the screen in the horizontal direction, a slide 1320 is performed to the right corresponding to the wheel event occurring forward direction (e.g., clockwise (a) 320) to perform a continuous movement of the items (e.g., content n−2 1323, content n−1 1322, and content n 1321).

Figure 13D:
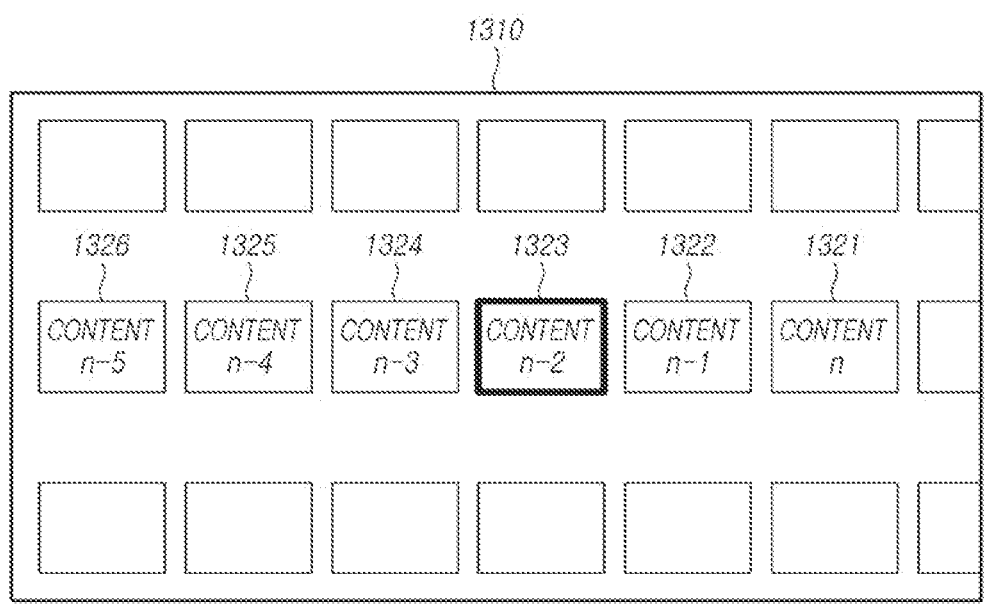
FIG. 13D is a view illustrating a screen displayed after items displayed on a screen are slid by a continuous operation in a display device according to an embodiment of the disclosure.

FIG. 13D is a view illustrating a screen displayed after items displayed on a screen are slid by a continuous operation in a display device (e.g., the display device 110 of FIG. 1) according to an embodiment of the disclosure.

Referring to FIG. 13D, as an example, the display device 110 may output a screen 1310 in which on an initial screen (the screen shown in FIG. 13A) in which a plurality of items (e.g., content 1 1311, content 2 1312, content 3 1313, content 4 1314, content 5, 1315, and content 6 1316)) are arranged on the screen in the horizontal direction, a continuous operation is performed to allow the initially selected item (e.g., content 2 1312 in FIG. 13A) to slide to select a specific item (e.g., content n−2 1324) by the continuous movement.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium (e.g., the memory 740) readable by a machine (e.g., the display device 700). For example, a processor (e.g., the processor 710) of the machine (e.g., the display device 700) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Storey), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component.

In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method for a user interface of a display device, the method comprising:
   based on wheel events that continuously occur according to manipulation of a wheel input device by a user reaching a reference number, obtaining an average interval of intervals between occurrence times at which the wheel events occur, respectively; and
   displaying a result of performing a continuous operation through a display based on the obtained average interval being shorter than a reference interval.

2. The method of claim 1, further comprising:
   displaying, through the display, a result of performing a unit operation in response to a wheel event, among the wheel events, until the wheel events that continuously occur reach the reference number.

3. The method of claim 1, further comprising:
   displaying a result of performing a unit operation through the display based on the average interval being longer than the reference interval.

4. The method of claim 1, further comprising:
   initializing a count value obtained by counting a number of occurrences of the wheel events based on the wheel input device not being manipulated for a preset time by the user.

5. The method of claim 1, wherein obtaining the average interval includes: identifying an interval corresponding to a time difference between an occurrence time of each wheel event and an occurrence time of a wheel event occurring immediately prior thereto; and based on n wheel events that reach the reference number occurring, obtaining an average of intervals identified at an occurrence time of each of the n wheel events as the average interval. Wherein n is a positive integer.

6. The method of claim 5, wherein obtaining the average interval includes:
   based on a new wheel event occurring while the continuous operation is performed, identifying an additional interval corresponding to a time difference between an occurrence time of the new wheel event and an occurrence time of a wheel event occurring immediately prior thereto; and
   updating the average interval based on the average interval and the additional interval.

7. The method of claim 6, wherein the updating of the average interval includes updating the average interval by an average of the additional interval and the intervals identified at the occurrence time of each of n−1 wheel events continuously occurring immediately prior to the new wheel event.

8. The method of claim 5, further comprising:
   displaying the result of performing the continuous operation through the display based on an updated average interval being shorter than the reference interval; and
   displaying the result of performing a unit operation through the display based on the updated average interval being longer than the reference interval.

9. The method of claim 1, further comprising:
   based on a new wheel event occurs while the continuous operation is performed, identifying an additional interval corresponding to a time difference between an occurrence time of the new wheel event and an occurrence time of a wheel event occurring immediately prior thereto;
   based on the additional interval being shorter than a preset buffer time difference, continuously performing the continuous operation; and
   based on the additional interval being longer than the preset buffer time difference, stopping the continuous operation and performing a unit operation.

10. A display device, comprising:
    an input unit configured to provide an electrical signal according to a wheel event occurring according to manipulation of a wheel input device by a user;
    at least one processor configured to recognize the wheel event occurring by the electrical signal provided from the input unit and perform a designated operation in response to the wheel event; and
    a display configured to display a screen reflecting a result of performing the designated operation by control of the at least one processor,
    wherein the at least one processor is configured to:
       based on wheel events including the wheel event continuously occurring reaching a reference number, obtain an average interval based on intervals between occurrence times at which the wheel events including the wheel event occur, respectively; and
       display a result of performing a continuous operation through the display based on the obtained average interval is shorter than a reference interval.

11. The display device of claim 10, wherein the at least one processor is configured to: identify an interval corresponding to a time difference between an occurrence time of each wheel event and an occurrence time of a wheel event occurring immediately prior thereto;
    and based on n wheel events that reach the reference number occurring, obtain an average of intervals identified at an occurrence time of each of the n wheel events as the average interval wherein n is a positive integer.

12. The display device of claim 11, wherein the at least one processor is configured to:
    based on a new wheel event occurring while the continuous operation is performed, identify an additional interval corresponding to a time difference between an occurrence time of the new wheel event and an occurrence time of a wheel event occurring immediately prior thereto; and update the average interval based on the average interval and the additional interval.

13. The display device of claim 12, wherein the at least one processor is configured to update the average interval by an average of the additional interval and the intervals identified at the occurrence time of each of n−1 wheel events continuously occurring immediately prior to the new wheel event.

14. The display device of claim 10, wherein the at least one processor is configured to:

based on a new wheel event occurring while the continuous operation is performed, identify an additional interval corresponding to a time difference between an occurrence time of the new wheel event and an occurrence time of a wheel event occurring immediately prior thereto;

based on the additional interval being shorter than a preset buffer time difference, continuously perform the continuous operation; and based on the additional interval being longer than the preset buffer time difference, stop the continuous operation and perform a unit operation.

15. The method of claim 1, wherein the wheel events occur in response to rotation of a wheel provided in the wheel input device by a preset angle according to the manipulation of the wheel input device by the user.

16. The display device of claim 10, wherein the at least one processor is configured to:

display, through the display, a result of performing a unit operation in response to a wheel event, among the wheel events, until the wheel events that continuously occur reach the reference number.

17. The display device of claim 16, wherein the at least one processor is configured to:

display, through the display, a result of performing a unit operation based on the average interval being longer than the reference interval.

18. The display device of claim 16, wherein the at least one processor is configured to:

initialize a count value obtained by counting a number of occurrences of the wheel events based on the wheel input device is not manipulated for a preset time by the user.

19. The display device of claim 10, wherein the at least one processor is configured to:

display the result of performing the continuous operation through the display based on an updated average interval being shorter than the reference interval; and display the result of performing the unit operation through the display if the updated average interval being longer than the reference interval.

20. The display device of claim 10, wherein the at least one processor is configured to:

determine the wheel events occur in response to rotation of a wheel provided in the wheel input device by a preset angle according to the manipulation of the wheel input device by the user.

* * * * *

UNITED STATES PATENT AND TRADEMARK OFFICE
CERTIFICATE OF CORRECTION

| | | |
|---|---|---|
| PATENT NO. | : 11,995,248 B2 | |
| APPLICATION NO. | : 18/137473 | |
| DATED | : May 28, 2024 | |
| INVENTOR(S) | : Junho Jung et al. | |

It is certified that error appears in the above-identified patent and that said Letters Patent is hereby corrected as shown below:

In the Claims

Column 36, Line 5:
In Claim 17, delete "claim 16," and insert --claim 10,--.

Column 36, Line 10:
In Claim 18, delete "claim 16," and insert --claim 10,--.

Signed and Sealed this
Tenth Day of September, 2024

Katherine Kelly Vidal
Director of the United States Patent and Trademark Office